United States Patent
Kanda

(10) Patent No.: US 8,073,233 B2
(45) Date of Patent: Dec. 6, 2011

(54) IMAGE PROCESSOR, MICROSCOPE SYSTEM, AND AREA SPECIFYING PROGRAM

(75) Inventor: Yamato Kanda, Tokyo (JP)

(73) Assignee: Olympus Corporation, Tokyo (JP)

( * ) Notice: Subject to any disclaimer, the term of this patent is extended or adjusted under 35 U.S.C. 154(b) by 1127 days.

(21) Appl. No.: 11/883,406

(22) PCT Filed: Jan. 19, 2006

(86) PCT No.: PCT/JP2006/300770
§ 371 (c)(1),
(2), (4) Date: Jul. 31, 2007

(87) PCT Pub. No.: WO2006/080239
PCT Pub. Date: Aug. 3, 2006

(65) Prior Publication Data
US 2008/0056610 A1   Mar. 6, 2008

(30) Foreign Application Priority Data

Jan. 31, 2005   (JP) ................................. 2005-024511

(51) Int. Cl.
*G06K 9/00* (2006.01)
(52) U.S. Cl. ........................ 382/133; 382/169
(58) Field of Classification Search .................. 382/169, 382/173, 133
See application file for complete search history.

(56) References Cited

U.S. PATENT DOCUMENTS 5,351,306 A * 9/1994 Finkler et al. ................. 382/169
(Continued)

FOREIGN PATENT DOCUMENTS

JP        05-298482        11/1993
(Continued)

OTHER PUBLICATIONS

Decision on Patent Grant dated Mar. 30, 2010 together with English language translation.

(Continued)

*Primary Examiner* — Hadi Akhavannik
(74) *Attorney, Agent, or Firm* — Scully, Scott, Murphy & Presser, P.C.

(57) ABSTRACT

An image processor that can suitably specify a predetermined area of a grayscale image is provided. An extreme value coordinate acquiring unit performs scanning on at least one of a plurality of pixels including a target pixel from the target pixel in accordance with gradient information corresponding to a change in a pixel value, and acquires a coordinate of the scanned pixel corresponding to an extreme value of the pixel value as a coordinate of an extreme value pixel corresponding to the target pixel. An area specifying unit labels each target pixel with an area identification mark used for specifying an area to which the each pixel belongs. The area specifying unit 103 labels each of different pixels corresponding to coordinates of extreme value pixels located close to each other within a particular range with an area identification mark indicating an identity of the area to which the pixels belong. Accordingly, the area to which each pixel belongs is able to be specified based on the area identification mark.

25 Claims, 33 Drawing Sheets

U.S. PATENT DOCUMENTS

| | | | |
|---|---|---|---|
| 6,081,617 A * | 6/2000 | Bangham et al. | 382/173 |
| 6,346,945 B1 * | 2/2002 | Mansurov et al. | 345/473 |
| 6,840,666 B2 * | 1/2005 | Enachescu et al. | 374/5 |
| 7,221,482 B2 * | 5/2007 | Yamazaki et al. | 358/2.1 |
| 2003/0059113 A1 * | 3/2003 | Walton et al. | 382/180 |
| 2003/0086603 A1 * | 5/2003 | Davidson et al. | 382/154 |

FOREIGN PATENT DOCUMENTS

| | | |
|---|---|---|
| JP | 3314759 | 6/2002 |
| JP | 2004-005383 | 1/2004 |
| WO | WO 2004/047023 A1 | 6/2004 |

OTHER PUBLICATIONS

Vincent, et al., "Watersheds in Digital spaces: An Efficient Algorithm Based on Immersion Simulations", Transactions on Pattern Analysis and Machine Intelligence (1991), vol. 13, No. 6, pp. 583-598.

* cited by examiner

TARGET PIXEL

TARGET PIXEL T
EXTREME VALUE PIXEL M

→ : LUMINANCE GRADIENT DIRECTION OF ROUTE PIXEL

| NUMBER OF DETERMINATION | VALUE IN MEMORY |
|---|---|
| 1 | ( x1, y1 ) |
| 2 | ( x2, y1 ) |
| 3 | ( x2, y2 ) |
| 4 | ( x3, y3 ) |
| 5 | ( x3, y4 ) |
| 6 | ( x4, y4 ) |

← COORDINATES OF TARGET PIXEL T

← COORDINATES OF REACH EXTREME VALUE PIXEL

RECOGNITION TARGET IMAGE (INPUT)

LABELED IMAGES (OUTPUT)

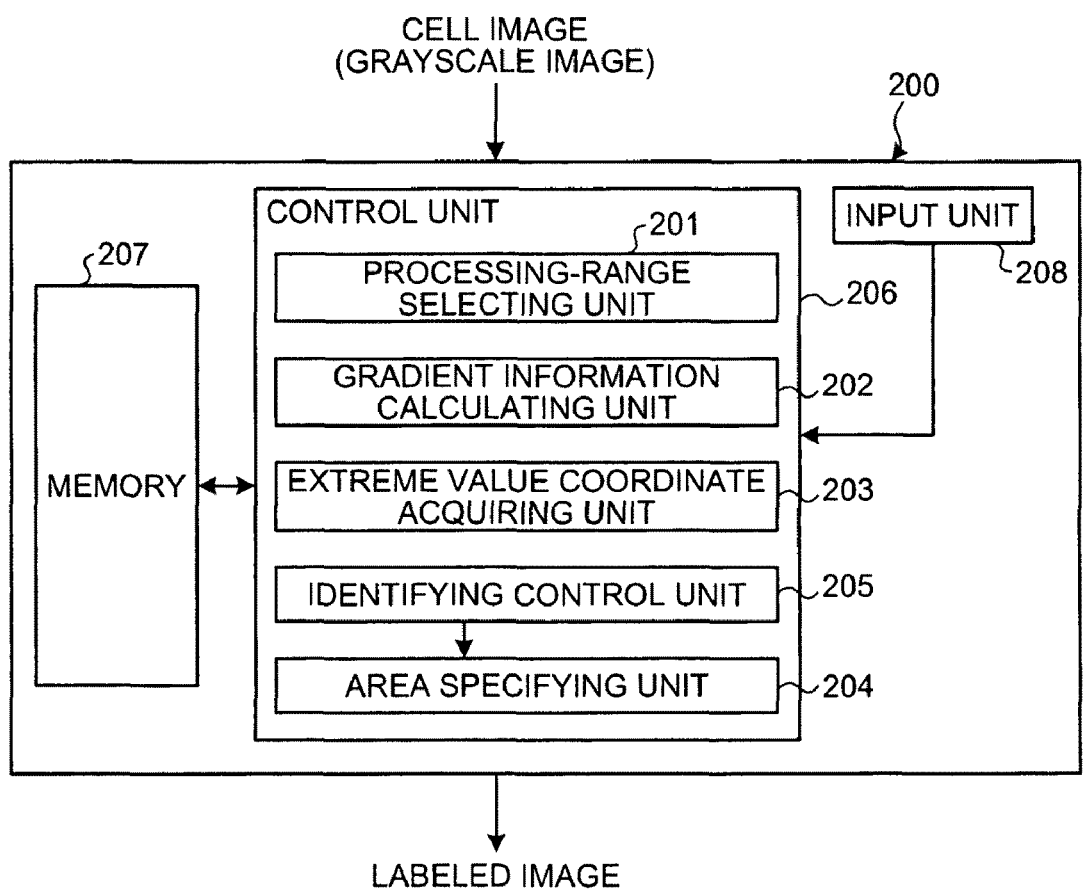

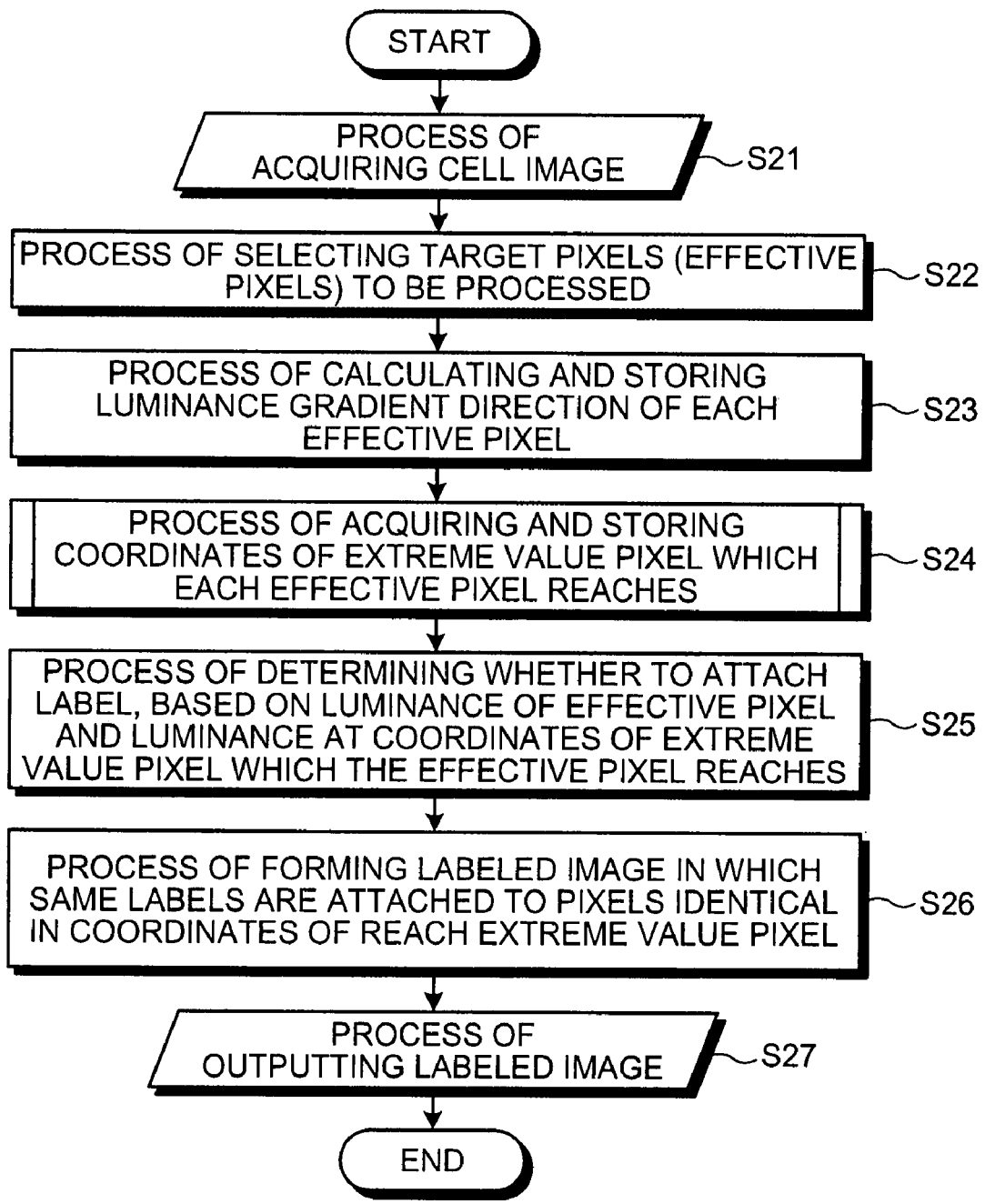

CELL IMAGE (INPUT)

LABELED IMAGE (OUTPUT)

CELL IMAGE

LABELED IMAGE

LUMINANCE CHANGE IN A
DIRECTION PERPENDICULAR TO
BOUNDARY A

LUMINANCE CHANGE IN A
DIRECTION PERPENDICULAR TO
BOUNDARY B

PIXEL USED FOR INDEX VALUE CALCULATION

INTEGRATED INDEX VALUE

CELL IMAGE (INPUT)

LABELED IMAGE (OUTPUT)

FIG.27
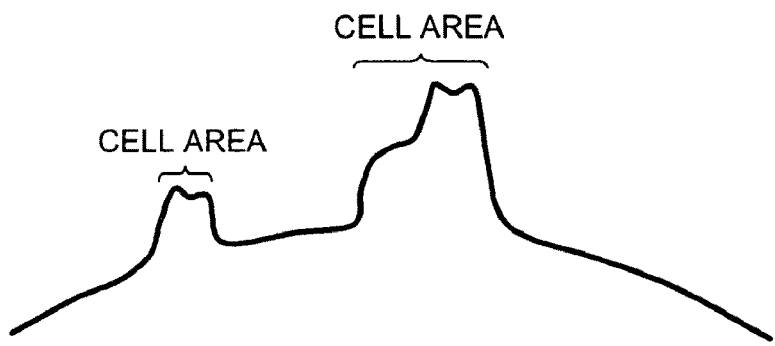
(a) DATA ON LUMINANCE HAVING SHADING
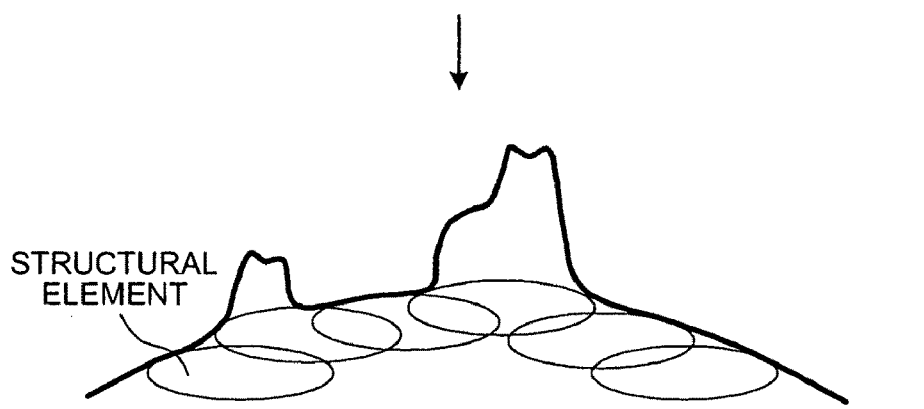
(b) DIAGRAM EXPLAINING GRAYSCALE OPENING PROCESS
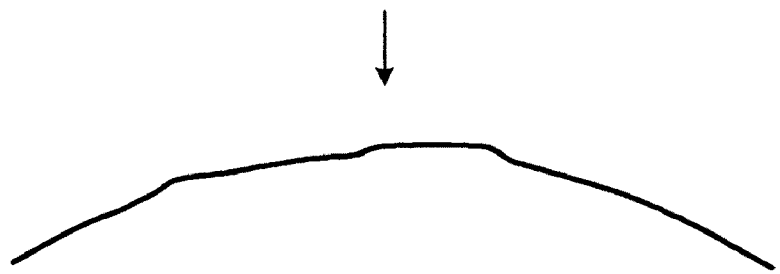
(c) RESULT OF GRAYSCALE OPENING PROCESS PERFORMED FOR (A)
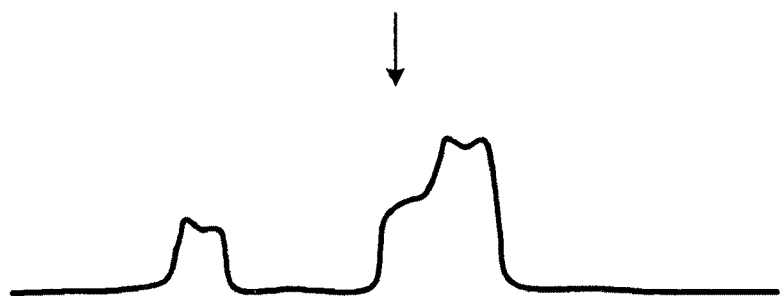
(d) RESULT OF a TO c (LUMINANCE DATA AFTER SHADING CORRECTION)

FIG.28
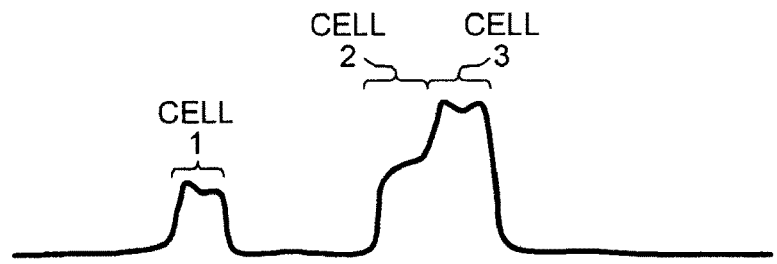
(a) LUMINANCE DATA AFTER SHADING CORRECTION
(b) RESULT OF EDGE EXTRACTION PROCESS FOR a
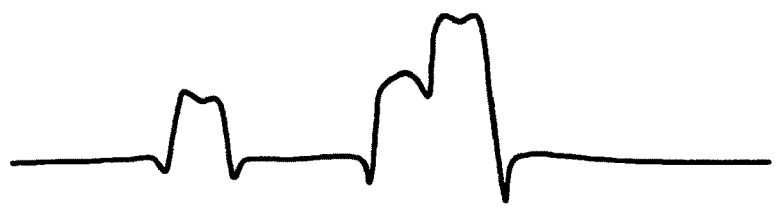
(c) RESULT OF BORDERLINE HIGHLIGHTING PROCESS BY a−α∗b
(d) RESULT OF SMOOTHING PROCESS PERFORMED FOR c

EXAMPLE OF IMAGE OF CELL IMAGED BY MICROSCOPE

EXAMPLE OF IMAGE AS A RESULT OF DIVIDING IMAGE BETWEEN CELL AREA AND BACKGROUND AREA

EXAMPLE OF IMAGE AS A RESULT OF RECOGNIZING CELL AREA

LUMINANCE
DATA   MINIMUM
VALUES

DETECTION OF
MINIMUM VALUE

EXPANDED
AREA

WATER
LEVEL

AREA EXPANSION (POURING)
FROM MINIMUM VALUE

WATER-
SHED

FORMATION OF BOUNDARY
(WATERSHED)

AREA  AREA AREA  AREA
 A     B    C     D

PROCESS (DIVISION)
ENDS

FOUR ADJACENT PATTERN

EIGHT ADJACENT PATTERN

RECOGNITION TARGET IMAGE

RESULT OF CENTER EXTRACTION
USING CIRCULAR MODEL

RESULT OF BORDERLINE
EXTRACTION

RECOGNITION TARGET AND ITS CENTER

RESULT OF SELECTION OF BOARDER LINE CANDIDATE PIXEL

RESULT OF EXTRACTION OF DYNAMIC BORDERLINE

IMAGE OBTAINED BY
REVERSING LUMINANCE

WATERSHED PROCESS
(FOUR ADJACENT PATTERN)

WATERSHED PROCESS
(EIGHT ADJACENT PATTERN)

IMAGE PROCESSOR, MICROSCOPE SYSTEM, AND AREA SPECIFYING PROGRAM

TECHNICAL FIELD

The present invention relates to an image processor that performs a process of dividing an area of a grayscale image, in particular, a process of recognizing an area of each cell based upon an image obtained by imaging the cells, and relates to a microscope system incorporating the image processor, and an area specifying program used to perform the processes.

BACKGROUND ART

An example of a conventional cell recognition processing is disclosed in Patent Document 1. According to the cell recognition process, a cell shape is superimposed on an image obtained by imaging a cell, and a position of a cell center is thereby extracted; pixel candidates defining a borderline of the cell are selected based upon a degree of coincidence of a direction of a luminance gradient of each pixel around the cell center and a direction toward the cell center from the each pixel; and a dynamic borderline is extracted using information on a magnitude of the luminance gradient corresponding to a position of the selected pixel candidates, thereby acquiring the borderline of the cell in detail.

The cell recognition process will be described in detail, focusing on its features. First, a method using a circular shape as a model for the cell shape is used to detect the cell center. Specifically, every cell within the image is subject to the following process performed such that, the luminance gradient direction of each target pixel within the image is calculated; and a pixel position which is a predetermined radius away in the gradient direction from the target pixel is given a point. As the result of such a process, the position where the luminance gradients which are a predetermined radius away from the periphery concentrate scores high points and is regarded as the cell center. Next, the borderline pixel candidate is selected based on the fact that the luminance gradient of the cell borderline is directed toward the cell center. The borderline pixel candidate is selected based upon a mathematical sign corresponding to an inner product of a luminance gradient vector of the target pixel located around the cell center and a displacement vector directed toward the cell center from the target pixel. In a dynamic borderline extraction process, a circular closed curved line of a specified radius around the cell center is set. If the closed curved line is on the borderline pixel candidate, the magnitude of the luminance gradient for the position of this pixel is subtracted. Such subtraction is performed for the entire closed curved line in order to attain an evaluation value. This evaluation value is minimized where the closed curved line coincides with the borderline candidate pixel to the greatest degree. Accordingly, while the shape of the closed curved line is partially changed, other evaluation values are repeatedly obtained in the same manner. The closed curved line when the obtained evaluation value is the smallest is regarded as a final cell borderline.

Examples of an area dividing method used for extracting a target area within an image include the Watershed algorithm (see Nonpatent Literature 1). The Watershed algorithm is a method for dividing an image, such as to divide an image by a boundary that is formed between different hollows where water stays when filling water into a topography regarding image grayscale information (e.g., luminance) as altitude.

FIG. 33A to FIG. 33D are diagrams explaining a principle of a process of the Watershed algorithm. FIGS. 33A to 33D show a one-dimensional example for simplified explanation. Firstly, a pixel having a minimum value is detected from luminance data of an image, as shown in FIG. 33A. Here, the pixel having the minimum value refers to a pixel having a luminance of which is the lowest among adjacent pixels. Next, as shown in FIG. 33B, areas are expanded from the minimum value in a similar manner as water stays in the hollows of luminance. In the expansion process, a boundary (Watershed) is formed at a position where areas expanded from different minimum values meet with each other, as shown in FIG. 33C. Finally, as shown in FIG. 33D, the image is divided by the boundary formed when the quantity of water held is greater than the maximum luminance. In the example shown in FIG. 33D, the image is divided into areas A, B, C and D by the forgoing process.

Meanwhile, there are two concepts of adjacent pixels in a two-dimensional grid image: one is a four adjacent pattern (refer to FIG. 34A) in which the target pixel in the middle has four adjacent pixels in the vertical and horizontal directions; and an eight adjacent pattern (refer to FIG. 34B) in which the target pixel in the middle has eight adjacent pixels in the vertical and horizontal directions and in the diagonal directions. The processes of detecting minimum values and expanding areas are carried out in accordance with either one of the concepts.

Patent Document 1: Japanese Patent No. 3314759.
Nonpatent Literature 1: Luc Vincent and Pierre Soille. Watersheds in digital spaces: An efficient algorithm based on immersion simulations. Transactions on Pattern Analysis and Machine Intelligence, Vol. 13, No. 6, pp. 583-598, June 1991.

DISCLOSURE OF INVENTION

Problem to be Solved by the Invention

However, each process described in Patent Document 1 is performed on the assumption that a model is provided for a cell shape. Therefore, this suffers from a fundamental problem in which, if the cell shape deviates from the modeled shape, an accurate result cannot be ensured. If the cell center is extracted using, for example, a circular model of a specific radius, a plurality of separate centers, as shown in FIG. 35B, are obtained in the middle of a recognition target image shown in FIG. 35A. Continuing the process regardless of such a result of center extraction leads to a borderline extraction result, as shown in FIG. 35C, in which three targets are erroneously recognized instead of one. Even if the center of only one target is acquired as shown in FIG. 36A, not only a borderline in the middle but borderlines around it are also selected as the borderline pixel candidates, as indicated by the white lines in FIG. 36B, in the area where a plurality of targets are close to one another. This is because the luminance gradient vectors of the borderlines around the borderline in the middle extend toward the center. If a dynamic borderline is extracted from the circular closed curved line (shown as a broken line in FIG. 36C) based on information of the result of the selection of the borderline candidate pixel, the extraction finally yields a result as shown by a white line in FIG. 36C. This leads to the recognition of a shape different from the shape to be recognized.

Accordingly, the recognition processing according to Patent Document 1 using such a model shape is not suitable to recognize the area of an image the shape of which is not circular but amorphous, such as a cell image. In this respect, the Watershed algorithm described in Nonpatent Literature 1 is suitable to recognize the area of a cell image or the like. In the case of using the Watershed algorithm for the recognition of a cell image, luminance information is reversed or edges are extracted in an image the luminance of which increases toward the center of the cell, as in a fluoroscopic image. Thereby cell portions are used as the hollows of luminance.

An image obtained by reversing the luminance of a recognition target image as shown in FIG. 35A is shown in FIG. 37A. FIGS. 37B and 37C show the results of using the Watershed algorithm in this image. FIG. 37B shows the result of processing the image by use of the four adjacent pattern whereas FIG. 37C shows the result of processing the same image by use of the eight adjacent pattern. The results of the two processes are slightly different. The four adjacent pattern shown in FIG. 37B is more natural in the division of an area at section A indicated by a broken line than the eight adjacent pattern. On the other hand, the eight adjacent pattern shown in FIG. 37C is more natural in the division of an area at section B indicated by a broken line than the four adjacent pattern. Accordingly, it is difficult to acquire a precise area division in both the sections A and B by the Watershed algorithm. Neither the four adjacent pattern nor the eight adjacent pattern results in precise area division or satisfies the area division that reflects minute changes in the luminance of a grayscale image.

The present invention was made in view of the drawbacks discussed above. It is therefore an object of the present invention to provide an image processor, a microscope system, and an area specifying program which make it possible to accurately specify a particular area of a grayscale image.

Means for Solving Problem

An image processor according to one aspect of the invention that performs a process of specifying an area to which a plurality of pixels of a grayscale image belongs includes a gradient information calculating unit, an extreme value coordinate acquiring unit, and an area specifying unit. Here, the grayscale image is formed based on a pixel value of each of the plurality of pixels arranged on a predetermined coordinate system. Further, the gradient information calculating unit calculates gradient information corresponding to a change in the pixel values between the plurality of pixels, the extreme value coordinate acquiring unit sets a pixel selected from the plurality of pixels as a target pixel, performs a scanning on at least one of the plurality of pixels including the target pixel from the target pixel in accordance with the gradient information, and acquires a coordinate of the scanned pixel corresponding to an extreme value of the pixel value as a coordinate of an extreme value pixel corresponding to the target pixel, and the area specifying unit labels the target pixel with an area identification mark used for specifying the area to which the plurality of pixels belong. Moreover, in the image processor, the extreme value coordinate acquiring unit successively sets the each of the plurality of pixels as the target pixel and acquires the coordinate of the extreme value pixel corresponding to the each of the plurality of pixels, and if coordinates of extreme value pixels corresponding to different pixels in the plurality of pixels are located close to each other within a particular range, the area specifying unit labels each of the different pixels with an area identification mark indicating the identity of the area to which the plurality of pixels belongs.

In the image processor, the gradient information calculating unit may calculate the gradient information by multiplying a difference between pixel values of adjacent pixels by a coefficient corresponding to a distance between the adjacent pixels.

In the image processor, the processing-range selecting unit may select a pixel to be processed by the gradient information calculating unit, the extreme value coordinate acquiring unit, and the area specifying unit.

The image processor may further include an input unit that externally receives a processing range specifying parameter used to specify a range that includes the pixel to be processed by the gradient information calculating unit, the extreme value coordinate acquiring unit, and the area specifying unit. Based on the processing range specifying parameter received by the input unit, the processing-range selecting unit selects the range that includes the pixel to be processed by the gradient information calculating unit, the extreme value coordinate acquiring unit, and the area specifying unit.

In the image processor, the extreme value coordinate acquiring unit may acquire the coordinate of the extreme value pixel corresponding to the target pixel with reference to a coordinate of an extreme value pixel corresponding to a pixel adjacent to the target pixel in a direction specified by the gradient information.

The image processor may further include an identifying control unit that controls attaching the area identification mark by the area-specifying unit, based on at least one of the pixel value of the target pixel or the pixel value of the extreme value pixel corresponding to the target pixel.

The image processor may further include an input unit that externally receives an identifying parameter used to control attaching the area identification mark by the area specifying unit. Based on the identifying parameter received by the input unit, the identifying control unit controls attaching the area identification mark by the area specifying unit.

The image processor may further include an extreme value coordinate integrating unit that, when the coordinate of the extreme value pixel corresponding to each of the plurality of pixels is within a predetermined coordinate range, calculates a coordinate of a fresh extreme value pixel in which the coordinates of the plurality of extreme value pixels are integrated, thereby acquires the coordinate of the fresh extreme value pixel as the coordinate of the extreme value pixel assigned before the integration. Based on the coordinate of the fresh extreme value pixel acquired by the extreme value coordinate integrating unit, the area specifying unit attaches the area identification mark to the target pixel.

The image processor may further include an input unit that externally receives an extreme value coordinate integration parameter used to specify the predetermined coordinate range. Based on the extreme value coordinate integration parameter received by the input unit, the extreme value coordinate integrating unit calculates the coordinate of the fresh extreme value pixel.

The image processor may further include an area integrating unit that determines whether a pixel value of a pixel that belongs to adjacent areas specified by different identification marks and that is located near a boundary between the adjacent areas satisfies a predetermined condition, and attaches the area identification mark indicating the identity to each of the adjacent areas if they satisfy the predetermined condition.

The image processor may further include an input unit that externally receives an area integration parameter used to determine whether the predetermined condition is satisfied. Based on the area integration parameter received by the input unit, the area integration unit determines whether the predetermined condition is satisfied.

The image processor may further include a borderline highlighting unit that highlights a borderline of the area of the grayscale image.

The image processor may further include an input unit that externally receives an edge highlighting parameter used to highlight the borderline of the area of the grayscale image. Based on the edge highlighting parameter received by the input unit, the borderline highlighting unit highlights the borderline of the area of the grayscale image.

The image processor may further include a shading correction unit that corrects a shading of the grayscale image.

The image processor may further include an input unit that externally receives a shading correction parameter used to correct the shading of the grayscale image. Based on the shading correction parameter received by the input unit, the shading correction unit corrects the shading of the grayscale image.

The image processor may further include a smoothing unit that perform a smoothing process to smooth a density of the grayscale image.

The image processor may further include an input unit that externally receives a smoothing parameter used for the smoothing process. In accordance with the smoothing parameter received by the input unit, the smoothing unit performs the smoothing process.

In the image processor, the grayscale image may be an image obtained by imaging a cell or tissue.

The image processor may further include a display unit that displays at least a parameter used for the process of specifying the area or an image involved in the process of specifying the area.

The image processor may further include a display unit that displays a procedure of the process of specifying the area. The display unit displays at least an image distinguishing the area specified by the area identification mark.

The image processor may further include a display unit that displays a procedure of the process of specifying the area. The display unit displays at least an image distinguishing the range that includes the pixel selected by the processing-range selecting unit.

The image processor may further include an area parameter calculating unit that calculates an area parameter determining a property of the area specified by the area identification mark, and an area parameter display unit that displays the area parameter.

The image processor may further include an imaging unit that acquires image data of the grayscale image.

A microscope system may include the image processor. The microscope system includes an imaging optical system used to enlarge and project a target. The imaging unit of the image processor acquires the image data by imaging the target enlarged and projected on the imaging face of the imaging optical system.

A computer program product according to another aspect of the invention, that has a computer readable medium including programmed instructions for specifying an area to which a plurality of pixels of a grayscale image belongs, the grayscale image being formed based on a pixel value of each of the plurality of pixels arranged on a predetermined coordinate system, wherein the instructions, when executed by a computer, cause the computer to perform the following. That is, the program cause the computer to perform: calculating gradient information corresponding to a change in the pixel value between the plurality of pixels; setting a pixel selected from the plurality of pixels as a target pixel; performing a scanning on at least one of the plurality of pixels including the target pixel from the target pixel in accordance with the gradient information; acquiring a coordinate of the scanned pixel corresponding to an extreme value of the pixel value as a coordinate of an extreme value pixel corresponding to the target pixel; and labeling the target pixel with an area identification mark used for specifying the area to which the plurality of pixels belongs. Further, the setting successively sets the each of the plurality of pixels as the target pixel, the acquiring acquires the coordinate of the extreme value pixel corresponding to the each of the plurality of pixels, and if coordinates of extreme value pixels corresponding to different pixels in the plurality of pixels are located close to each other within a particular range, the labeling labels each of the different pixels with an area identification mark indicating the identity of the area to which the plurality of pixels belongs.

Effect of the Invention

The image processor according to the present invention performs scanning of a pixel from a target pixel in accordance with gradient information indicating a direction of a change in a pixel value between pixels, and acquires a coordinate indicating an extreme value of a pixel value of the scanned pixel, as a coordinate of an extreme value pixel corresponding to the target pixel. The image processor also labels each target pixel with an area identification mark used for specifying an area to which each pixel belongs. Where the coordinates of the extreme value pixels acquired for different pixels are close to one another within a predetermined range, an area identification mark indicating an identity of a cell area to which the pixels belong is attached to these pixels. Accordingly, in accordance with the area identification mark thus attached, the image processor specifies each area, thereby precisely specifying a particular area.

BRIEF DESCRIPTION OF DRAWINGS

FIG. 9 is a block diagram schematically illustrating an example of a configuration of an image processor according to a second embodiment of the present invention;

FIG. 10 is a flowchart schematically illustrating a process performed by the image processor of the second embodiment;

FIG. 27 shows diagrams illustrating an example of a shading correction made by a top hat process;

FIG. 28 shows diagrams illustrating a process of making a cell area clear by a borderline highlighting process and a smoothing process;

Figure 1:
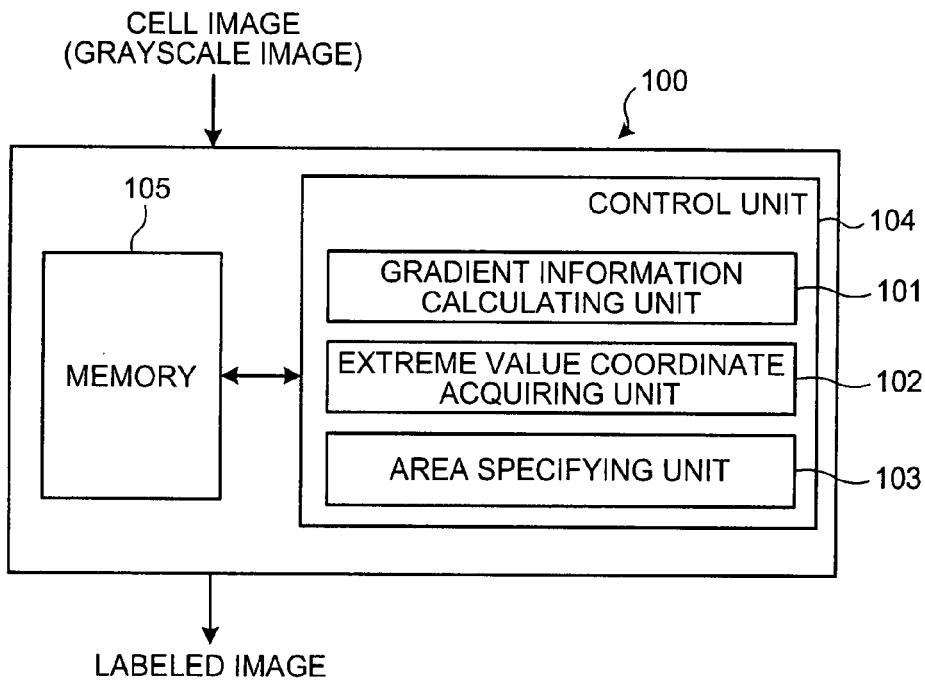
FIG. 1 is a block diagram schematically showing an example of a configuration of an image processor according to a first embodiment of the present invention.

EXPLANATIONS OF LETTERS OR NUMERALS 101 gradient information calculating unit
102 extreme value coordinate acquiring unit
103 area specifying unit
201 processing-range selecting unit
202 gradient information calculating unit
203 extreme value coordinate acquiring unit
204 area specifying unit
205 identifying control unit
208 input unit
301 processing-range selecting unit
302 gradient information calculating unit
303 extreme value coordinate acquiring unit
304 extreme value coordinate integrating unit
305 identifying control unit
306 area specifying unit
307 area integrating unit
310 input unit
401 shading correction unit
402 borderline highlighting unit
403 smoothing unit
404 processing-range selecting unit
405 gradient information calculating unit
406 extreme value coordinate acquiring unit
407 extreme value coordinate integrating unit
408 identifying control unit
409 area specifying unit
410 area integrating unit
413 input unit
501 microscope
502 imaging unit
507 display unit
508 input unit
510 shading correction unit
511 borderline highlighting unit
512 smoothing unit
513 processing-range selecting unit 514 gradient information calculating unit
515 extreme value coordinate acquiring unit
516 extreme value coordinate integrating unit
517 identifying control unit
518 area specifying unit
519 area integrating unit
520 area parameter calculating unit

BEST MODES FOR CARRYING OUT THE INVENTION

Exemplary embodiments of the present invention will now be described with reference to the accompanying drawings.

In the descriptions of the exemplary embodiments given below, a luminance is used as a pixel value for the present invention. However, the pixel value for the present invention may not be luminance but may be density, gradation, or intensity in accordance with its properties.

First Embodiment

Figure 35A:
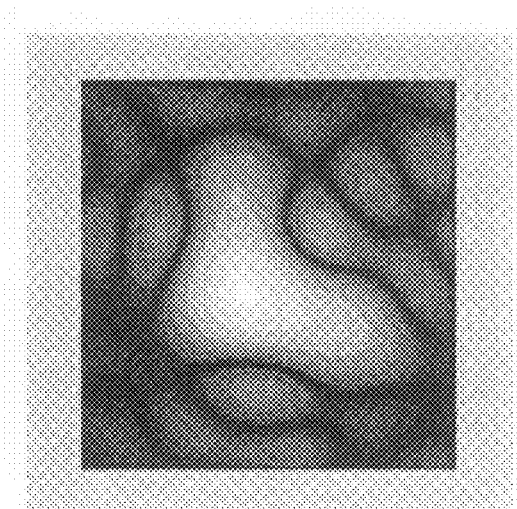
FIG. 35A shows an example of a recognition target image using a circular model superimposition system.
Figure 35B:
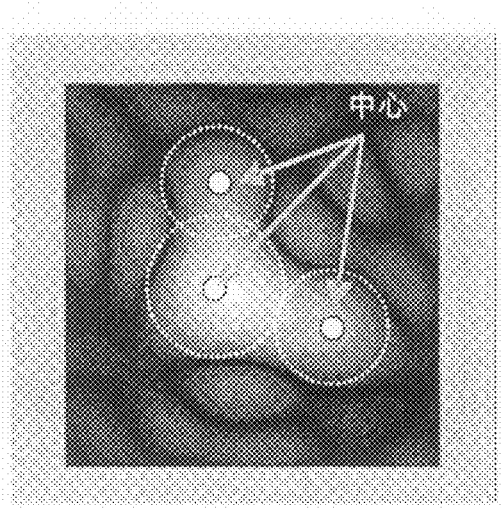
FIG. 35B shows an example of a center extraction result yielded by the circular model superimposition.
Figure 35C:
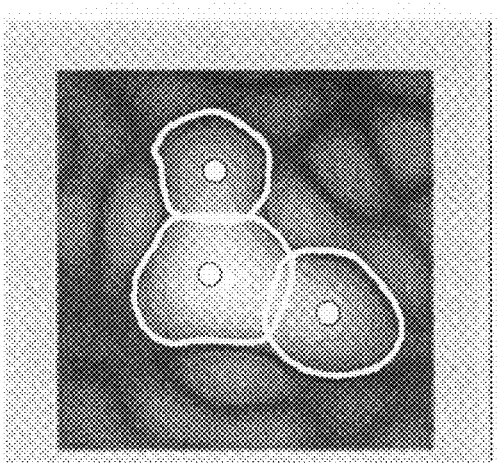
FIG. 35C shows an example of failure in borderline extraction by the circular model superimposition.
Figure 36A:
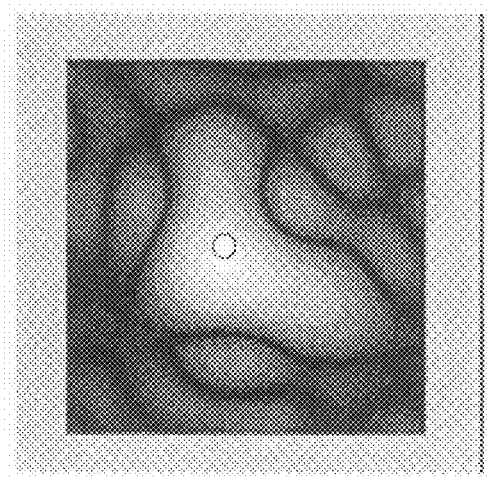
FIG. 36A shows an example of an image of the recognition target using a circular model superimposition system.
Figure 36B:
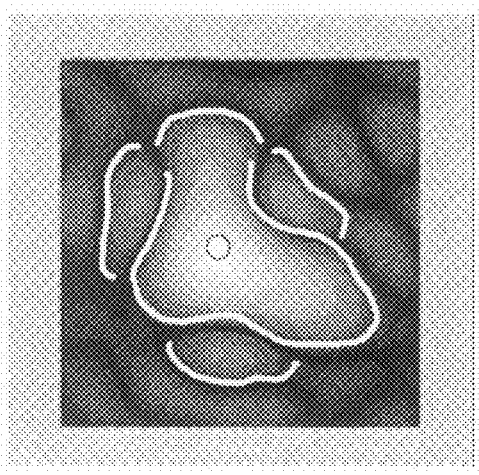
FIG. 36B shows an example of the borderline candidate pixel selection result yielded by the circular model superimposition.
Figure 36C:
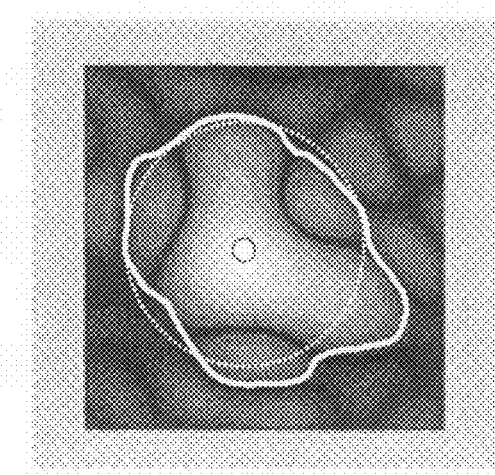
FIG. 36C shows an example of failure in borderline extraction by the circular model superimposition.

A description is given of an example of a first embodiment, which is applied to an image processor that specifies each cell area of a grayscale image, such as a cell image, to which corresponding pixels belong. The grayscale image is formed based upon luminance serving as a pixel value for each of a plurality of pixels arranged on an XY two-dimensional coordinate system that realizes a predetermined coordinate system. The first embodiment assumes, as a cell image, a grayscale image in which luminance increases toward a center of a cell, as shown in FIG. 35A. However, the first embodiment can also be used to divide an area according to superfine luminance edges by reversing gradient directions and extreme values, as described below.

FIG. 1 is a schematic block diagram showing an example of a configuration of an image processor according to the first embodiment of the present invention. An image processor 100 according to the first embodiment has a control unit 104 configured as a microcomputer, which includes: a gradient information calculating unit 101, which calculates as gradient information a luminance gradient direction indicating a tendency of a change in luminance between pixels; an extreme value coordinate acquiring unit 102, which sets as a target pixel a pixel selected from a plurality of pixels, then performs scanning on at least one of the plurality of pixels including the target pixel from the target pixel in the luminance gradient direction, and acquires coordinates of the scanned pixel corresponding to an extreme value of the luminance as coordinates of an extreme value pixel corresponding to the target pixel; and an area specifying unit 103, which labels the target pixel with an area identification mark used for specifying the area to which the pixel belongs. The image processor 100 also includes a memory 105 for storing an input image and data used in each unit.

The extreme value coordinate acquiring unit 102 successively sets each pixel of the plurality of pixels as the target pixel, and acquires the coordinates of the extreme value pixel corresponding to each pixel of the plurality of pixels. If the coordinates of the extreme value pixels corresponding to different pixels are located close to each other within a particular range, the area specifying unit 103 attaches, for example, a same label to each of the different pixels as an area identification mark indicating the area to which the pixels belong. In the first embodiment, a configuration for inputting a cell image to be processed and a configuration for processing an output labeled image are not limited in particular.

Figure 2:
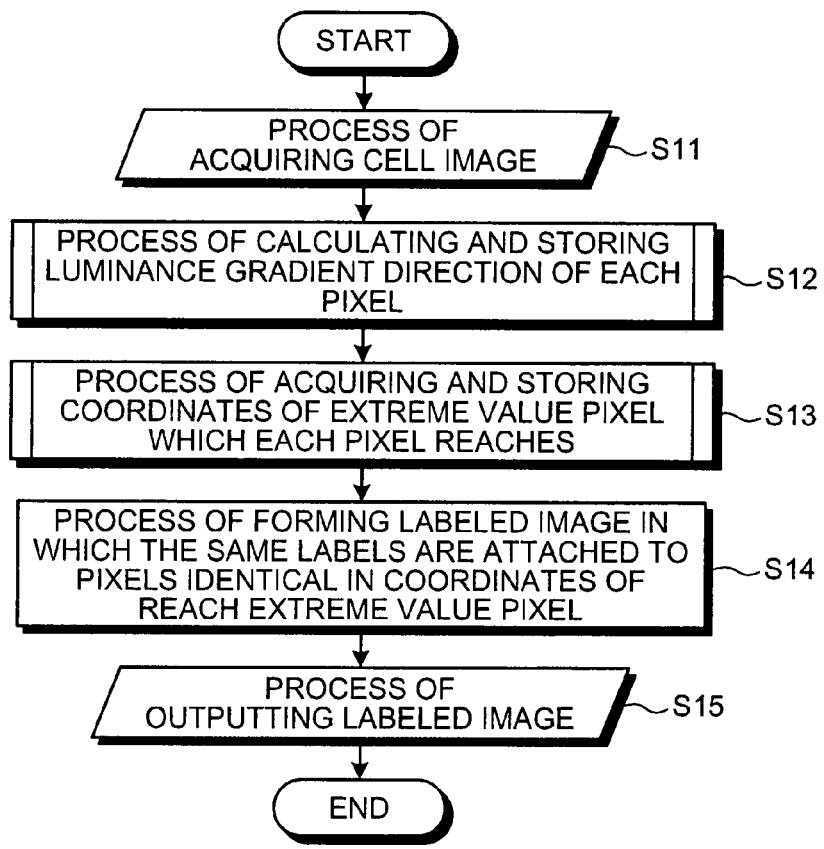
FIG. 2 is a flowchart schematically showing a process performed by the image processor of the first embodiment.

FIG. 2 is a flowchart schematically illustrating a process performed by the control unit 104 of the image processor 100 according to the first embodiment. Initially, a cell image input to the image processor 100 is stored in the memory 105 (step S11). Subsequently, the gradient information calculating unit 101 determines a direction of a luminance gradient between pixels within the cell image, and stores data about the calculated direction of the luminance gradient in the memory 105 (step S12).

Figure 3:
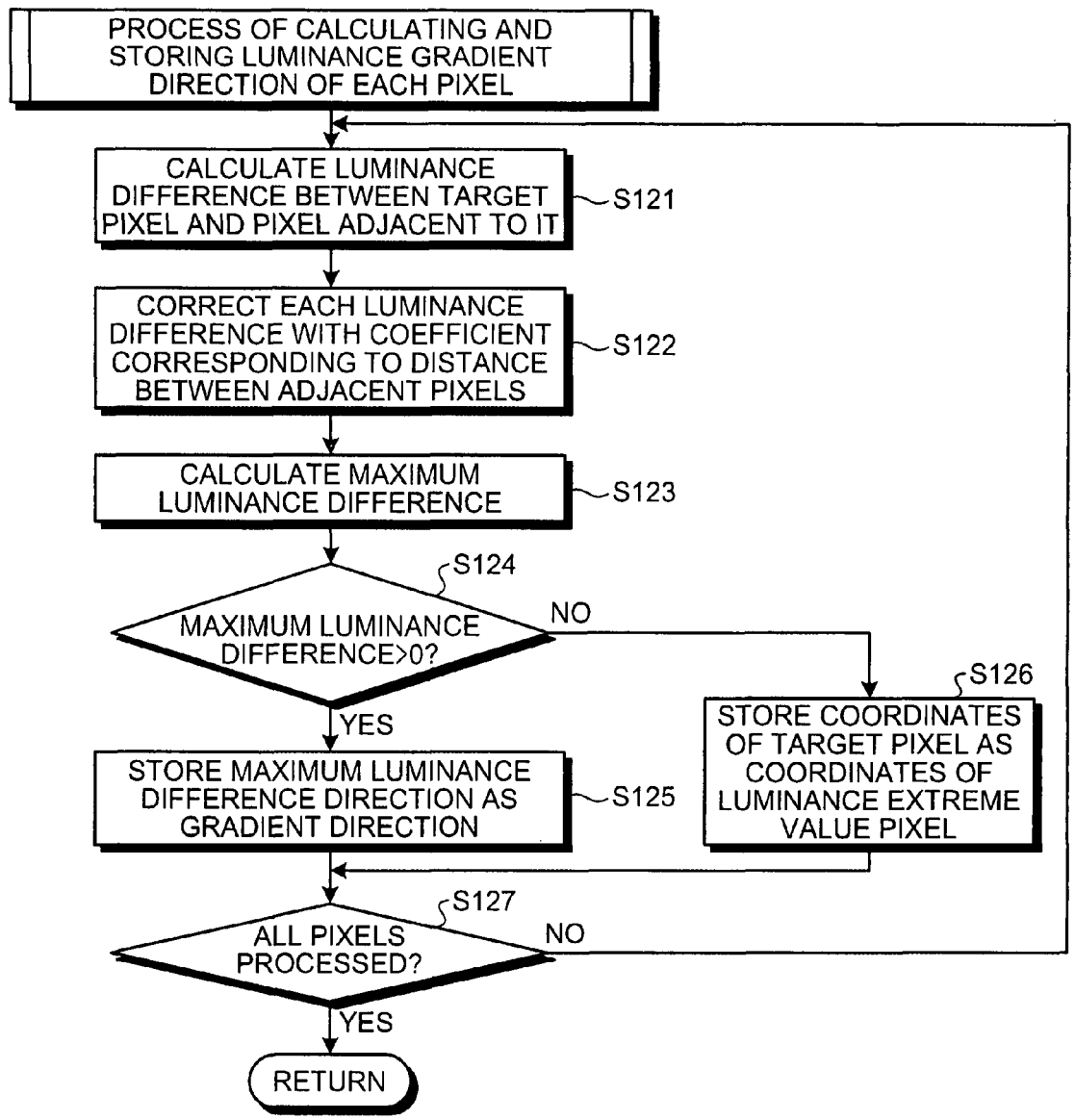
FIG. 3 is a flowchart schematically showing an example of a process in step S12.
Figure 34A:
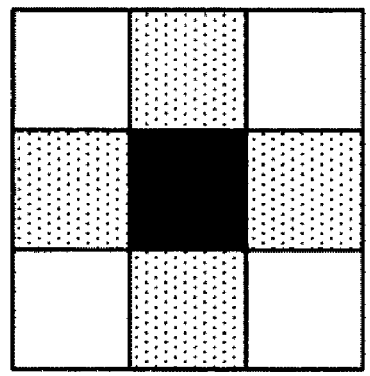
FIG. 34A shows an example of a four adjacent pattern, which is a concept of an adjacent pixel.
Figure 34B:
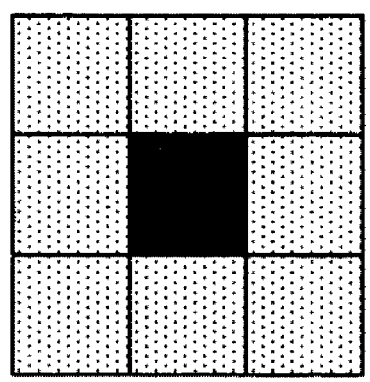
FIG. 34B shows an example of an eight adjacent pattern, which is a concept of an adjacent pixel.

FIG. 3 is a flowchart schematically illustrating an example of a process of a subordinate routine of step S12 performed by the gradient information calculating unit 101. The gradient information calculating unit 101 first determines a luminance difference between a target pixel in the cell image and each of the pixels vertically, horizontally, or diagonally adjacent to the target pixel, namely eight adjacent areas (refer to FIG. 34B) (step S121). If the luminance of the adjacent pixel is greater than that of the target pixel, the luminance difference has a positive value. Conversely, if the luminance of the adjacent pixel is less than that of the target pixel, the luminance difference has a negative value. Here, a distance between a center of the target pixel and a center of each pixel diagonally adjacent to the target pixel is $\sqrt{2}$ times as long as a distance between the center of the target pixel and a center of each pixel vertically or horizontally adjacent to the target pixel. Therefore, a luminance difference between the target pixel and each pixel diagonally adjacent to the target pixel is corrected by multiplying the luminance difference by $1/\sqrt{2}$ that is a coefficient yielded by this distance difference (step S122).

After the correction of each luminance difference, the luminance differences are compared to find a maximum value (Step S123). If the maximum value is greater than 0 (Yes in step S124), a direction toward the adjacent pixel from which the maximum luminance difference is found is stored in the memory 105 as a direction of the luminance gradient of the target pixel (step S125). On the other hand, if the maximum value is equal to or smaller than 0 (No in step S124), information indicating that this target pixel is the extreme value pixel is stored in the memory 105 (step S126). After this series of steps, the processing of one certain target pixel ends.

Figure 4:
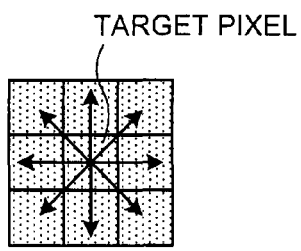
FIG. 4 shows examples of a luminance gradient direction of a target pixel.

After finishing the processing of one certain target pixel, the control unit 104 determines whether the above-described processing has been performed for all the pixels within the cell image (step S127). If any one of the pixels has not been processed, the processing from steps S121 to S126 is repeated. And, if all the pixels have been processed, processing by the gradient information calculating unit 101 ends. As a result of the processing described above, a sign indicating one of the eight directions shown in FIG. 4 or a sign indicating the extreme value pixel is stored in the memory 105 for each of the pixels of the cell image. Each sign is used as data about a luminance gradient direction that indicates a tendency of luminance change between pixels.

Figure 5:
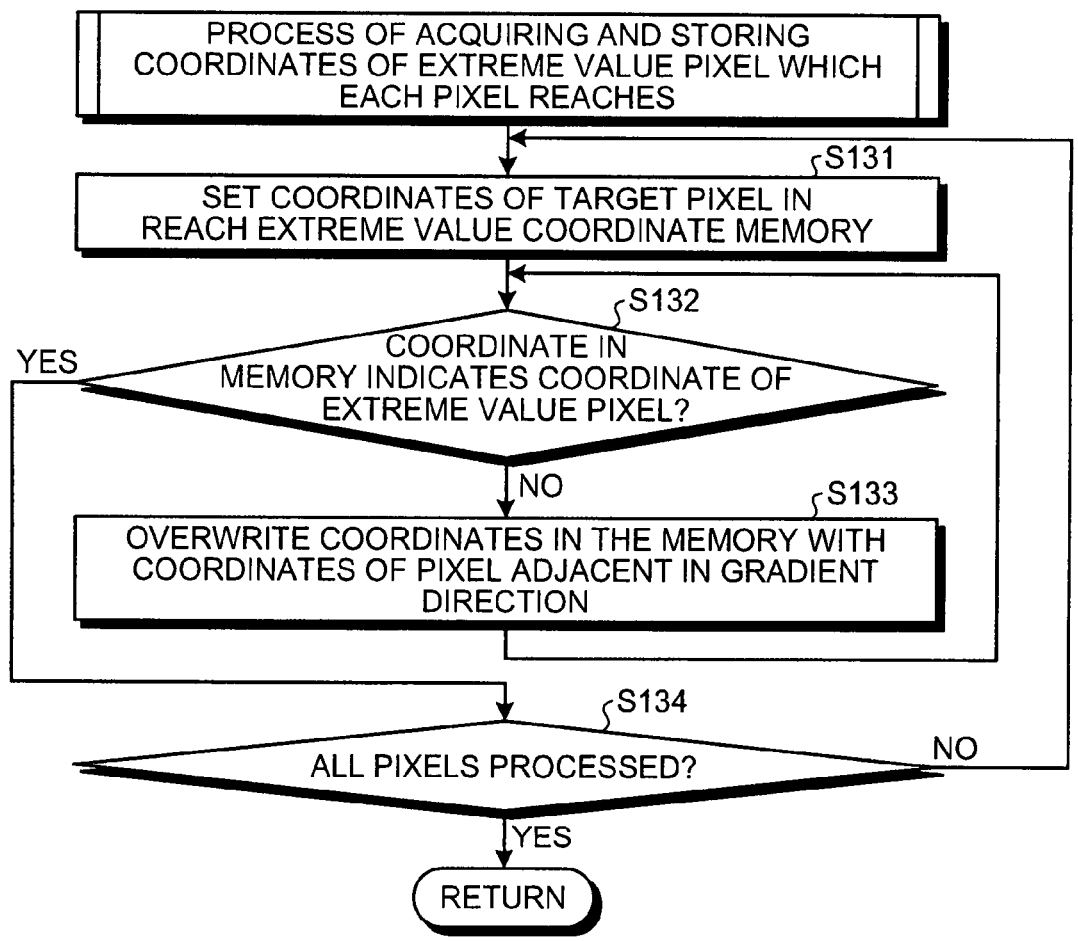
FIG. 5 is a flowchart schematically showing an example of a process in step S13.

Next, the extreme value coordinate acquiring unit 102 acquires the coordinates of the extreme value pixel which, when each of the pixels is successively set as the target pixel, the target pixel reach by scanning, and then stores the coordinates in the memory 105 (step S13). FIG. 5 is a flowchart schematically illustrating an example of a process of a subordinate routine performed by the extreme value coordinate acquiring unit 102 in step S13. The extreme value coordinate acquiring unit 102 firstly writes the coordinates of the target pixel in a reach extreme value coordinate memory (located in the memory 105) used to store the coordinates of an extreme value pixel which each successively set target pixel reaches (step S131). Then, based on the data about the luminance gradient directions acquired by the gradient information calculating unit 101, the control unit 104 determines whether coordinates in the reach extreme value coordinate memory indicates coordinate of an extreme value pixel (step S132). If the determination is made that the coordinate does not indicate the extreme value pixel, the luminance gradient direction of the coordinates in the reach extreme value coordinate memory is obtained from luminance gradient direction data, and the coordinates in the reach extreme value coordinate memory are overwritten with the coordinates of the pixel adjacent to the target pixel in the luminance gradient direction (step S133). After the coordinates have been overwritten, the determination in step S132 is made again. If the coordinate in the reach extreme value coordinate memory indicates the coordinates of the extreme value pixel as the result of the determination in step S132, the processing of this target pixel ends.

Figures 6, 7:
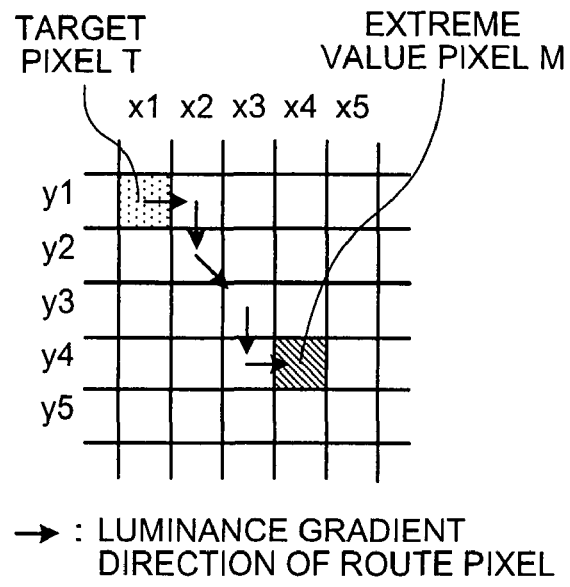
FIG. 6 is a graph schematically illustrating an example of a scanning route taken from a certain target pixel to an extreme value pixel.
FIG. 7 is a table schematically illustrating changes in coordinate data in a memory, obtained by repeating the scanning processing of a certain target pixel T.

FIG. 6 is a graph schematically illustrating an example of a scanning route taken from a certain target pixel T defined by coordinates (x1, y1) to an extreme value pixel M defined by coordinates (x4, y4). FIG. 7 is a table schematically illustrating changes in coordinate data in the reach extreme value coordinate memory, obtained by repeating such processing of the target pixel T. Specifically, when a first determination is made, the coordinates (x1, y1) of the target pixel T are stored in the reach extreme value coordinate memory as an initial value. Thereafter, a plurality of pixels is successively scanned following the luminance gradient direction data, and as a result, the reach extreme value coordinate memory is overwritten with each of the coordinates of the pixels successively scanned. FIG. 7 shows that the coordinates (x4, y4) of the extreme value pixel M are finally acquired in a sixth determination.

After processing one certain target pixel, the control unit 104 determines whether all the pixels in the cell image have been processed as the target pixel (step S134). If there are any unprocessed pixels, each of the unprocessed pixels is successively set as the target pixel, and the processing from steps S131 to S133 is repeated. If there are no unprocessed pixels, the control unit 104 terminates all the processing performed by the extreme value pixel acquiring unit 102. As a result of the processing described above, the coordinates of the reach extreme value pixel are stored in the memory 105 for each of the pixels in the cell image.

Subsequently, based upon the data of the coordinates of the extreme value pixel which each pixel reaches, the area specifying unit 103 forms labeled images such that pixels identical with coordinates of the extreme value pixels are given the same labels, which serve as an area identification mark that identifies a cell area to which the pixels belong (step S14). That is, the area specifying unit 103 labels each pixel with the area identification mark used to specify the area to which the pixel belongs. In this case, exactly the same labels are attached to the pixels with exactly identical coordinates of the extreme value pixels, but this is not limited thereto. Instead, where the coordinates of the extreme value pixels are located close to each other within a certain range, the pixels may be given the same label indicating the identity of the cell area to which the coordinates of the extreme value pixels belong. For example, if a peak of a luminance distribution is flat so that an extreme value is not indicated by one pixel, and if pixels adjacent to this pixel are extreme value pixels identical in luminance, the coordinates of the reach extreme value pixels differ. However, labels indicating identity can be attached to the pixels whose coordinates have reached the coordinates of a plurality of extreme value pixels that are identical in luminance.

Figure 8A:
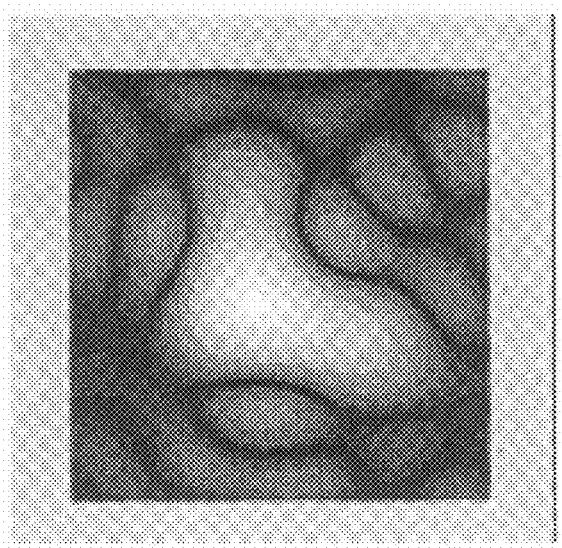
FIG. 8A shows an example of an image input to the image processor of the first embodiment.
Figure 8B:
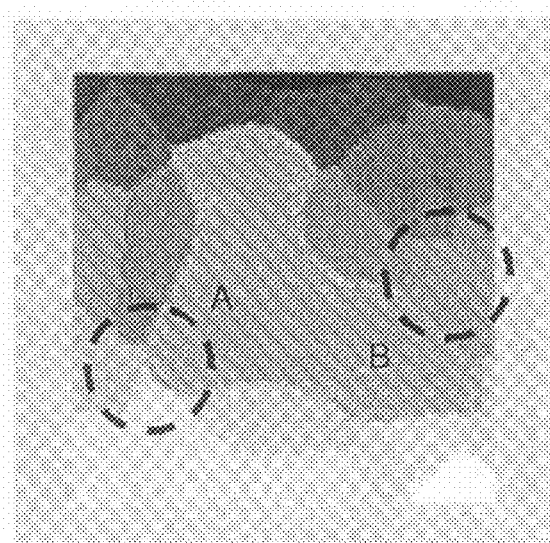
FIG. 8B shows an example of a labeled image output after processing by the image processor of the first embodiment.

Lastly, the label image thus formed is output (step S15), and the image processor 100 terminates the process of specifying the area. FIG. 8A shows an example of an image, identical to that shown in FIG. 35A, input to the image processor of the first embodiment of the present invention. FIG. 8B shows an example of a labeled image output after such an input image has been processed by the image processor of the first embodiment. As is clear from FIG. 8B, the shapes of non-circular objects may be adequately recognized.

Figure 37A:
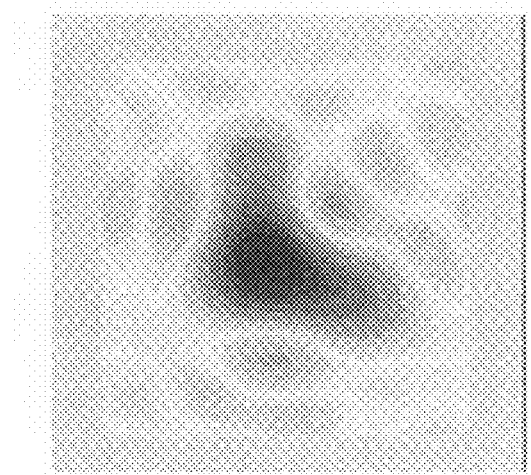
FIG. 37A shows an example of the recognition target image shown in FIG. 35A, a luminance of which is reversed in order to use the Watershed algorithm system.
Figure 37B:
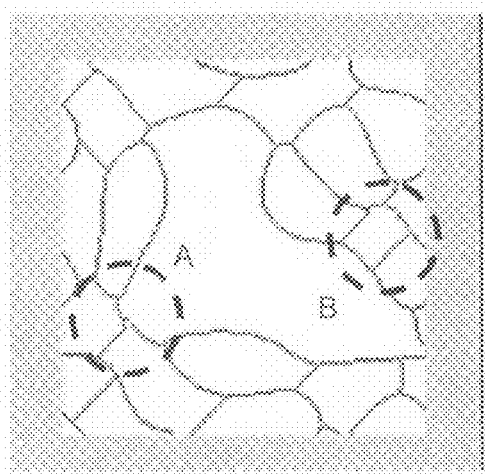
FIG. 37B shows an example of the result of a Watershed algorithm process using a four adjacent pattern.
Figure 37C:
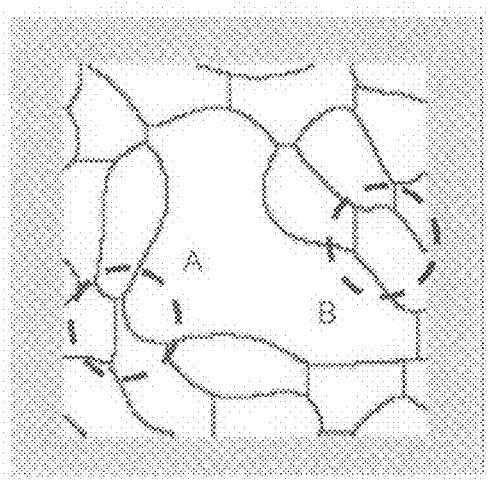
FIG. 37C shows an example of the result of the Watershed algorithm process using the eight adjacent pattern.

Meanwhile, in the first embodiment, the direction of the maximum value of luminance difference is processed as the direction of the luminance gradient, and the maximum luminance as the extreme value. However, this may be reversed such that the direction of the minimum value of luminance difference may be processed as the direction of a luminance gradient, and the minimum luminance as the extreme value. In this case, the area is divided according to the luminance edges of the grayscale image. The output that results from inputting an image such as that shown in FIG. 37A, which is an image with reverse luminance to that shown in FIG. 35A, is the same as the output shown in FIG. 8B. In this case, referring to recognition shapes in areas A and B shown in each of FIGS. 37B, 37C, and 8B, both the sections A and B in FIG. 8 are precisely divided. This result from the calculation of the luminance gradient information after the correction is made taking account of any distance difference between each target pixel and each of the pixels adjacent to the target pixel.

In addition, the coordinates of an extreme value pixel which each pixel reaches by its being scanned by the extreme value coordinate acquiring unit 102 may be acquired by a scanning method as described below. Initially, based on luminance gradient direction data, a pixel T adjacent to an extreme value pixel M and a gradient direction of the pixel T are obtained. If the gradient direction of the pixel T is toward the extreme value pixel M, the coordinates of the extreme value pixel M is stored in a memory for storing the coordinates of an extreme value pixel which each pixel T reaches. For a pixel T' adjacent to the pixel T which has acquired the coordinates of the extreme value pixel M, a pixel T" adjacent to the pixel T' concentrically beyond the extreme value pixel M, together with the gradient direction of the pixel T", is obtained. If the gradient direction of the pixel T" is toward the pixel T', the coordinates of the extreme value pixel M are stored in the memory for storing the coordinates of the extreme value pixel which the pixel T" reaches. This process is repeated until there are no unprocessed adjacent pixels T' that have acquired the coordinates of the extreme value pixel M. Processing all the extreme value pixels of a target image in the manner described above makes it possible to obtain the coordinates of the extreme value pixel which each pixel reaches.

As described above, the image processor according to the first embodiment recognizes each of the cell areas of the cell image. Also, the image processor accurately divides each area according to the luminance edges the grayscale images of which are superfine.

Second Embodiment

A description is given of an example of a second embodiment, which is also applied in an image processor that specifies each of the cell areas of a grayscale image, such as a cell image, to which corresponding pixels belong. The grayscale image is formed based upon luminance serving as a pixel value for each of a plurality of pixels arranged on an XY two-dimensional coordinate system that realizes a predetermined coordinate system. The second embodiment also assumes, as a cell image, a grayscale image in which luminance increases toward a center of a cell, as shown in FIG. 35A. However, the second embodiment can also be used to divide an area according to superfine luminance edges by reversing gradient directions and extreme values, as illustrated in the first embodiment.

FIG. 9 is a block diagram schematically illustrating an example of a configuration of the image processor according to the second embodiment. An image processor 200 according to the second embodiment has a control unit 206 configured as a microcomputer, which includes: a processing-range selecting unit 201, which selects a pixel to be processed by each unit (hereinafter called "effective pixel" if necessity requires); a gradient information calculating unit 202, which determines a luminance gradient direction as gradient information that indicates a tendency of luminance change between the effective pixels; an extreme value coordinate acquiring unit 203, which sets, as a target pixel, a pixel selected from a plurality of effective pixels, then performs scanning of each pixel from the target pixel in the luminance gradient direction, and acquires, as the coordinates of an extreme value corresponding to the target pixel, the coordinates where the luminance of the scanned pixel indicates the extreme value; and an area specifying unit 204, which labels the target pixel with an area identifying mark used for specifying the area to which the effective pixel belongs; and an identifying control unit 205, which controls labeling by the area specifying unit 204 based on at least the luminance of the target pixel or the luminance of the extreme value pixel corresponding to the target pixel. The image processor 200 also has a memory 207 for storing an input image and data used in each unit.

The extreme value coordinate acquiring unit 203 successively sets each of the plurality of effective pixels as the target pixel, and acquires the coordinates of the extreme value pixel corresponding to each of the effective pixels. If the coordinates of the extreme value pixels each of which is corresponding to different effective pixels are close to each other within a specific range, the area specifying unit 204 labels each of these different effective pixels with an area identification mark that identifies the area to which the effective pixels belong. In the second embodiment, a configuration for inputting a cell image to be processed and a configuration for processing an output labeled image are not limited in particular.

FIG. 10 is a flowchart schematically illustrating a processing performed by the image processor 200 of the second embodiment. Initially, the cell image input to the image processor 200 is acquired and stored in the memory 207 (step S21). Subsequently the processing-range selecting unit 201 selects from the cell image effective pixels to be processed (step S22). In each cell image, a background area of very low luminance is an unnecessary area and may be omitted in order to increase a processing speed by subjecting only the cell area to be recognized to a subsequent processes by the corresponding units. Therefore, setting a threshold value for distinguishing between a background area and a cell area and comparing the threshold value with the luminance of each pixel allows only pixels in the cell area to be selected as effective pixels.

Meanwhile, the threshold may be changed according to a position within an image or may be uniform across the image. Alternatively, the threshold may be set in advance as fixed or may be calculated based on the image as a variable (refer to 'binarization' on page 502, IMAGE ANALYSIS HANDBOOK by editors Mikio Takagi and Haruhisa Shimoda, University of Tokyo Press). Otherwise, a threshold may be externally given to perform the processing. In this case, for example, the image processor 200 may be designed such that an input unit 208 is provided for externally receiving a processing range specifying parameter used to specify a range that includes the pixel to be processed by the gradient information calculating unit 202, the extreme value coordinate acquiring unit 203, and the area specifying unit 204; and based upon the processing range specifying parameter received by the input unit 208, the processing-range selecting unit 201 selects the range that includes the pixel to be processed by the gradient information calculating unit 202, the extreme value coordinate acquiring unit 203, and the area specifying unit 204.

After the effective pixels are selected, the gradient information calculating unit 202 determines each luminance gradient direction between the effective pixels within the cell image, and stores in the memory 207 the data about the luminance gradient direction thus determined (step S23). A procedure by the gradient information calculating unit 202 is basically the same as the procedure (FIG. 3) of the first embodiment, except that a determination is made as to whether all the effective pixels have been processed, instead of determining whether all the pixels within the image are processed in step S127.

Figure 11:
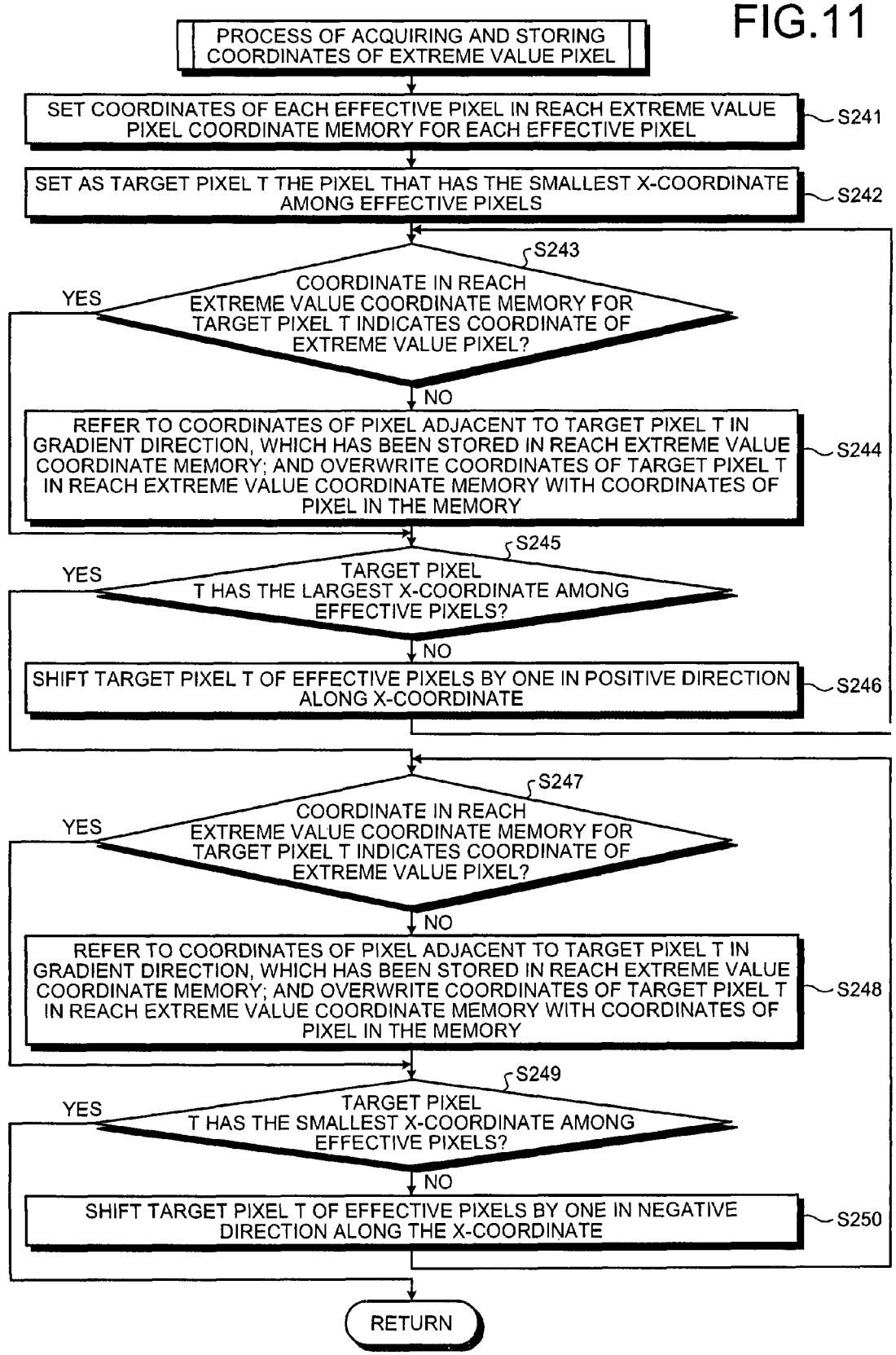
FIG. 11 is a flowchart schematically illustrating an example of a process in step S24.

Next; the extreme value coordinate acquiring unit 203 acquires the coordinates of extreme values which the corresponding effective pixels reach by scanning when the each effective pixel is successively set as the target pixel. Then, the unit 203 stores the coordinates of the extreme values in the memory 207 (step S24). FIG. 11 is a flowchart schematically illustrating an example of a process of a subordinate routine performed in step S24 by the extreme value coordinate acquiring unit 203. First, in order to simplify the explanation, the subordinate routine performed in step S24 is described in terms of a line of pixels one-dimensionally arranged on an X-coordinate system. The extreme value coordinate acquiring unit 203 firstly writes the coordinates of each effective pixel into a reach extreme value coordinate memory (located in the memory 207) used to store coordinates of extreme value pixels which each of the target pixels successively set in the effective pixels reaches (step S241). Then, the pixel that has the smallest X-coordinate among the effective pixels is set as a target pixel T to be processed (step S242).

Then, based on the data about the luminance gradient direction acquired by the gradient information calculating unit 202, the control unit 206 determines whether the coordinate of the target pixel T in the reach extreme value coordinate, memory indicates coordinate of an extreme value pixel (step S243). If the determination is made that the coordinate does not indicate the coordinate of the extreme value pixel, the luminance gradient direction of the target pixel T in the reach extreme value coordinate memory is obtained from the luminance gradient direction data; then, reference is made to coordinate of a pixel adjacent to the target pixel T in the gradient direction, which has been stored in the reach extreme value coordinate memory; and the coordinate of the target pixel T in the reach extreme value coordinate memory is overwritten with the coordinate used for the reference (S244). If the coordinate of the target pixel T indicate the coordinate of the coordinate of the extreme value pixel as the result of the determination in step S243 subsequent to the overwriting, the control unit 206 determines whether the target pixel T has the largest X-coordinate among the effective pixels (step S245). If the determination is "No" in step S245, the target pixel T of the effective pixels is shifted by one in a positive direction along the X-coordinate in order to be processed (step S246). Then, the routine from step 243 and subsequent steps are repeated.

If the result of the step S245 is "Yes", that is, if the target pixel T has the largest X-coordinate among the effective pixels, the control unit 206 determines based upon the data on the luminance gradient direction acquired by the gradient information calculating unit 202 whether the coordinate of the target pixel T in the reach extreme value coordinate memory indicates the coordinate of the extreme value pixel (step S247). If the coordinate does not indicate the coordinate of the extreme value pixel as a result of the determination, the luminance gradient direction of the target pixel T in the reach extreme value coordinate memory is obtained from the luminance gradient direction data; a reference is made to coordinate of a pixel adjacent to the target pixel T in the gradient direction, which has been stored in the reach extreme value coordinate memory; and the coordinate of the target pixel T in the reach extreme value coordinate memory is overwritten with the coordinate used for the reference (step 248).

If the coordinate of the target pixel T indicate the coordinate of the extreme value pixel as a result of the determination in step S247 subsequent to the overwriting, the control unit 206 determines whether the target pixel T has the smallest X-coordinate among the effective pixels (step S249). If the determination is "No" in step S249, the target pixel T of the effective pixels is shifted by one in a negative direction along the X-coordinate in order to be processed (step S250). Then, the routine from step 247 and subsequent steps are repeated. If the determination is "Yes" in step S249, that is, if the target pixel T has the smallest X-coordinate among the effective pixels, processing by the extreme value pixel acquiring unit 203 ends.

Figure 12:
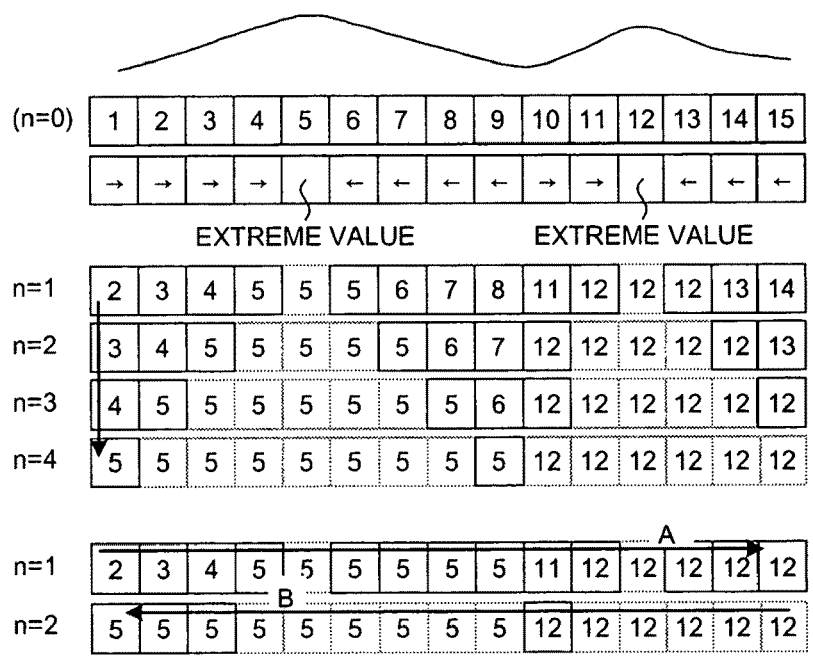
FIG. 12 shows diagrams schematically illustrating examples of processing in an exemplified one-dimensional arrangement.

This process produces the same effect as in the case where the extreme-value coordinate acquiring process (shown in FIG. 5) according to the first embodiment is performed for the effective pixels. However, in the second embodiment in particular, referring to the coordinate data of the extreme value pixel which the adjacent pixel reaches increases the processing speed. FIG. 12 is a diagram schematically illustrating effects of the second embodiment. Here, as in the description given above, an explanation will be given using an example in which pixels are arranged one-dimensionally. Referring to an example of luminance data shown in the upper table in FIG. 12, the luminance gradient direction data of coordinates 1 to 15 are as shown in the figure and pixels at coordinates 5 and 12 indicate extreme value pixels. In the case where the coordinate of the extreme value pixel which each pixel reaches is acquired by following the processing steps described in the first embodiment, the pixel at coordinate 1 changes to 2, then 3, and then 4 along the luminance gradient direction in terms of the values stored in the extreme value coordinate memory; and in the fourth change, this pixel acquires the coordinate 5 indicating the coordinate of the extreme value pixel. Similarly, each of the other pixels also acquires the coordinate of the extreme value pixel which it reaches by the number of steps corresponding to its distance from the extreme value pixel. In the course of the process given, the memory has to be overwritten thirty times in total.

On the other hand, in the case where the coordinates of an extreme value pixel which each pixel reaches by its being subject to the above-described steps of the second embodiment such that target pixels to be processed are changed one after another in a direction of arrow A (i.e., the positive direction in the coordinates) shown in FIG. 12 (steps S242 to S246), the pixels at coordinates 1 to 6 and 10 to 13 yield the same results obtained by the first scanning of the pixels in the first embodiment. However, as for the pixels at coordinates 7 to 9 and 14 to 15, they can immediately acquire the coordinates of the reach extreme value pixels regardless of the first scanning, on account of successive references to the results of adjacent pixels that have already acquired the coordinates of their reach extreme value pixels. Subsequently, a second scanning is performed while the target pixels to be processed are successively changed in the direction of the arrow B in FIG. 12 (i.e., in the negative direction of the coordinates) (steps S247 to S250). Consequently, all the pixels acquire the coordinate of the reach extreme value pixels. In such process, one cycle of the forward and backward processes suffices, the memory is overwritten only seventeen times in total, and accordingly a processing speed higher than that in the first embodiment is possible.

Figure 13:
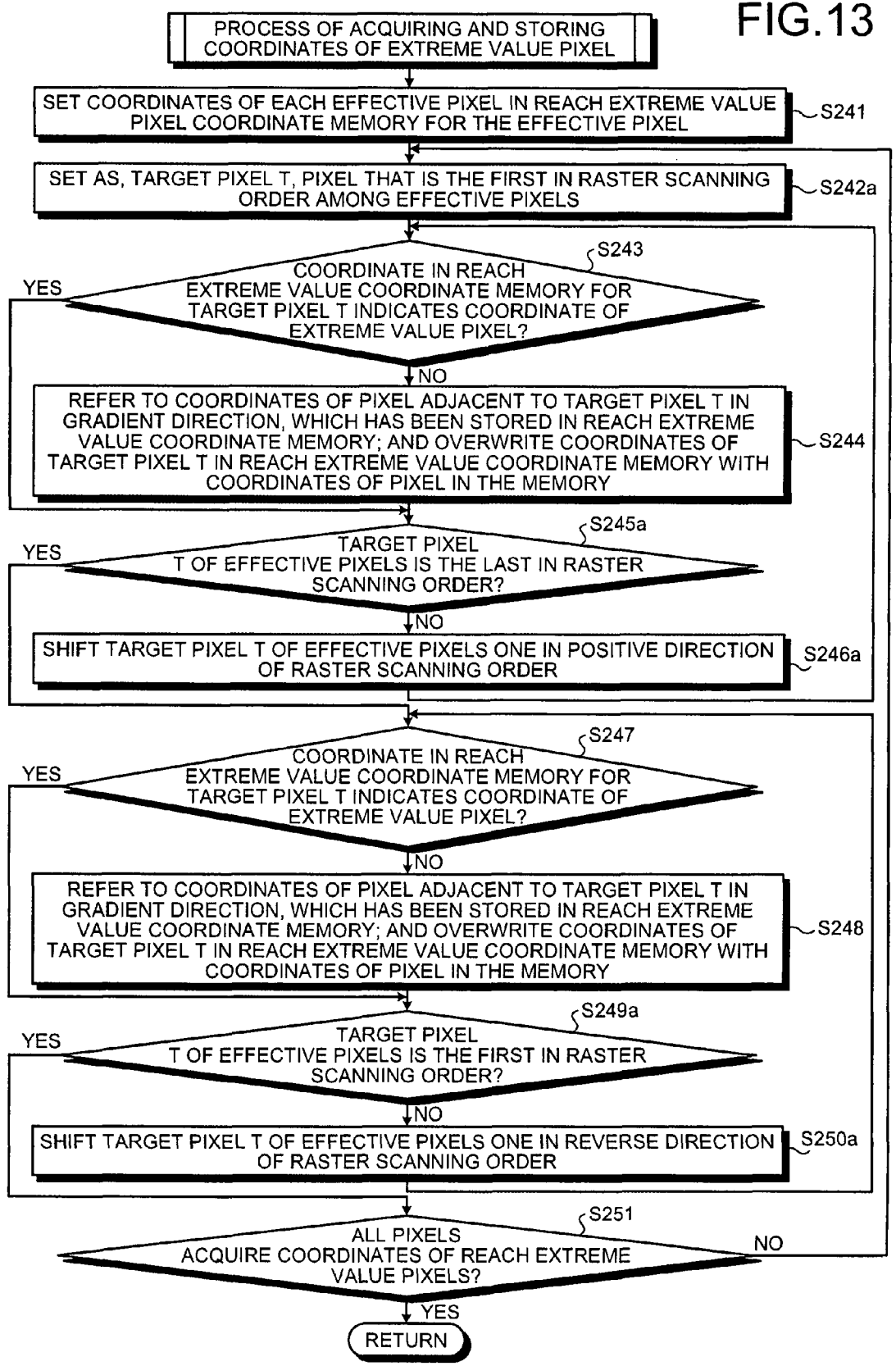
FIG. 13 is a flowchart schematically illustrating an example of a process in step S24 in exemplified two-dimensional arrangement.

Although FIGS. 11 and 12 illustrate an example of the one-dimensional processing on only the X-coordinate system in order to simplify the explanation, a cell image actually processed in the second embodiment is, for example, an image on an XY two-dimensional coordinate system. FIG. 13 is a flowchart schematically illustrating an example of processing an image on the two-dimensional coordinate system, which is to be processed by the extreme value coordinate acquiring unit 203. Processes in steps S241, S243, S244, S247, and S248 in FIG. 13 are identical to those in steps indicated by identical numbers in FIG. 11. The processes in steps S242a, 245a, S246a, S249a, and S250a in FIG. 13 correspond to those in steps S242, s245, S246, S249, and S250, respectively, in FIG. 11; the processing same as that performed for the X-coordinate as shown in FIG. 11 is performed in raster scanning order. Specifically, in step S242a, the pixel that is the first in the raster scanning order among the effective pixels is set as a target pixel T. In step 245a, the control unit 206 determines whether the target pixel T is the last in the raster scanning order. In step S246a, the target pixel T of the effective pixels is shifted one in the positive direction of the raster scanning order. In step S249, the control unit 206 determines whether the target pixel T is the first in the raster scanning order. In step S250a, the target pixel T of the effective pixels is shifted one in a reverse direction of the raster scanning order so as to set the next target pixel T.

The raster scanning order used in the steps S242, S245, S246, S249, and S250 indicates a scanning order in which processes are performed as follows: a line of pixels at a Y-coordinate identical to that of a scanning initiation point are scanned, one pixel to another, such that a value of the X-coordinate increases as scanning proceeds; after the scanning of the pixel that has the greatest X-coordinate in the line of pixels at the Y-coordinate identical to that of the scanning initiation pixel, the Y-coordinate is shifted one in the positive direction; and then another line of pixels at a Y-coordinate identical to this Y-coordinate is successively scanned from the pixel at the smallest X-coordinate to the pixel at the largest X-coordinate. The end of the left edge of the image is regarded as the origin of the coordinate system, the rightward direction of the image as the positive direction of the X-coordinate, and the downward direction of the image as the positive direction of the Y-coordinate.

Subsequent to the processing of the effective pixels in the normal direction in step S242a to S246a based on the principle of one-dimensional processing, the control unit 206 next processes the effective pixels in the reverse direction in steps S247 to S250a.

Thereafter, in step S251, the control unit 206 determines whether all the effective pixels have acquired coordinate of reach extreme value pixels. If an affirmative determination is obtained, processing by the extreme value coordinate acquiring unit 203 ends. Conversely, if not all the effective pixels have acquired the coordinates of their reach extreme value pixels yet, ("No" in step S251), the flow returns to step S242a.

Figure 14:
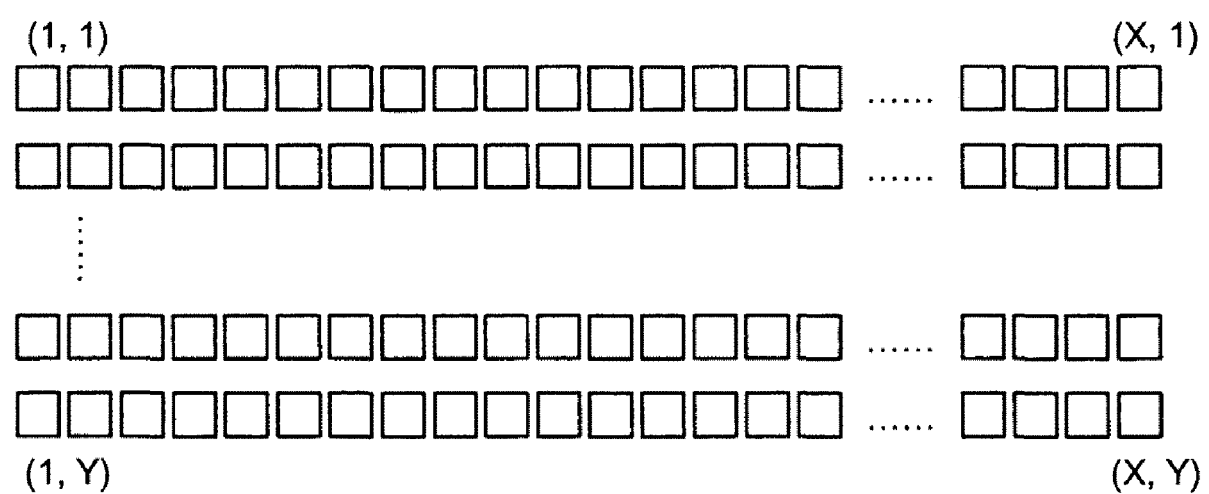
FIG. 14 shows an XY two-dimensional coordinate system.

That is, if an image to be processed is one on the XY two-dimensional coordinate system as shown in FIG. 14, scanning proceeds following the steps S242a to S246a, as shown schematically in FIG. 15(a), and scanning further proceeds according to the steps S247 to S250a, as shown schematically in FIG. 15(b). Thereafter, until all the effective pixels acquire the coordinates of the reach extreme value pixels, the cycle of scanning following the steps S242a to S246a as shown schematically in FIG. 15(c) and scanning following the steps S247 to 250a as shown schematically in FIG. 15(d), is repeated.

Figure 15:
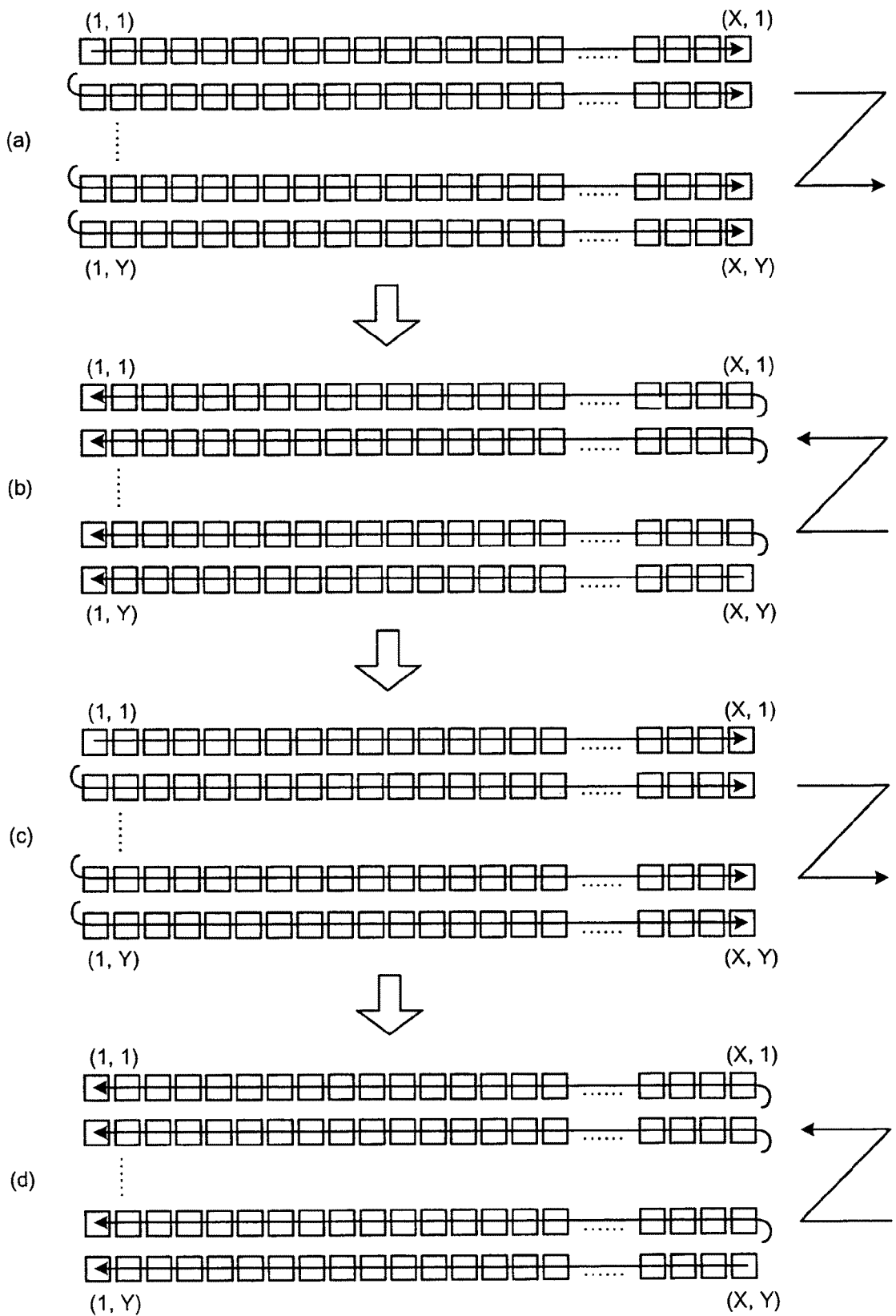
FIG. 15 is a diagram illustrating an example of processing in two-dimensional pixel arrangement.

Since the two-dimensional image includes vertical and diagonal gradient data, lines do not always converge by a single set of forward and backward scans. That is, the coordinates of the reach extreme value pixels of all target pixels cannot be obtained. However, the experiments conducted by the inventor(s) of the present invention have shown that lines converge by repeating the processes from steps S242a to S250a shown in FIG. 13 twice. This corresponds to conducting two sets of forward and backward scans, as shown in FIG. 15 (a) to (d), at one time.

The data on the coordinates of the extreme value pixel which each effective pixel reaches is thus acquired. Thereafter, based on the luminance V1 of the effective pixel and the luminance V2 of the extreme value pixel which the effective pixel reaches, the identifying control unit 205 determines whether to label the pixel with an area identification mark (step S25). A description of specific methods will be given below.

a. The luminance V2 and a threshold T1 are compared. If the luminance V2 is equal to or greater than the threshold T1, the pixel is labeled. Thus, a group of pixels that reach the coordinates of extreme value pixels the luminances of which are equal to or greater than the threshold T1 are labeled and, accordingly, only a bright cell area in the image can be recognized. In this case, the threshold T1 may be given as fixed. Alternatively, based on the luminance distribution of only the extreme value pixels, the threshold T may be calculated by, for example, a discriminant analysis method as variable. Conversely, labeling only pixels the luminances of which are equal to or below the threshold T1 makes it possible to recognize a darkish cell area.

b. Based on the luminance V2, the threshold $T2=\alpha V2+\beta$ ($\alpha$ and $\beta$ each represents a coefficient) is calculated. If the luminance V1 is equal to or greater than the threshold T2, a label is attached to the pixel. Thus, the threshold T2 determining an edge between a bright cell area and a dark cell area can be altered as necessity requires.

Meanwhile, a parameter such as the processing method and a threshold for controlling labeling, may be externally given and processed. In this case, an input unit 208 is provided in order to externally receive the identifying parameter that controls labeling by the area specifying unit 204; and based on the identifying parameter received by the input unit 208, the identifying control unit 205 may control labeling by the area specifying unit 204.

Subsequently, based on the data on the coordinates of the extreme value pixel which each pixel reaches, the area specifying unit 204 labels the effective pixels with identical coordinates of the extreme value pixels, using the same area identification mark that identifies the cell area to which the effective pixels belong (step S26). That is, the area specifying unit 204 provides each of the effective pixels a label as the area identification mark identifying the cell area to which the effective pixel belongs. In this case, exactly the same label is attached to all the pixels which have exactly the same coordinates of the extreme value pixel. However, this label may not necessarily be attached to only the effective pixels that have exactly the same coordinates of the extreme value pixel. As in the first embodiment, if the coordinates of the extreme value pixels are close to one another within a predetermined range, a label indicating the identity of a cell area to which the extreme value pixels belong may be attached.

Figure 16A:
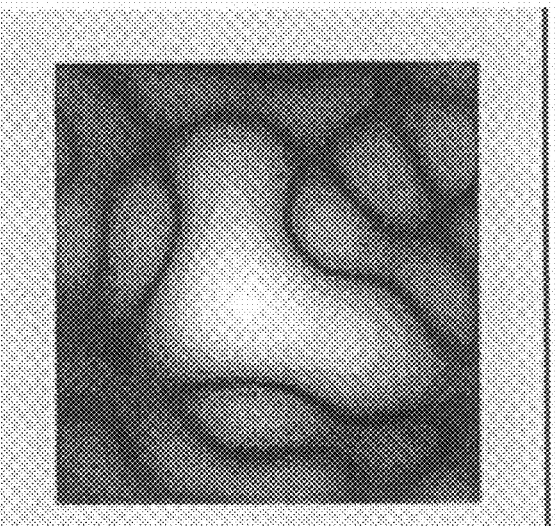
FIG. 16A shows an example of an image input to the image processor of the second embodiment.
Figure 16B:
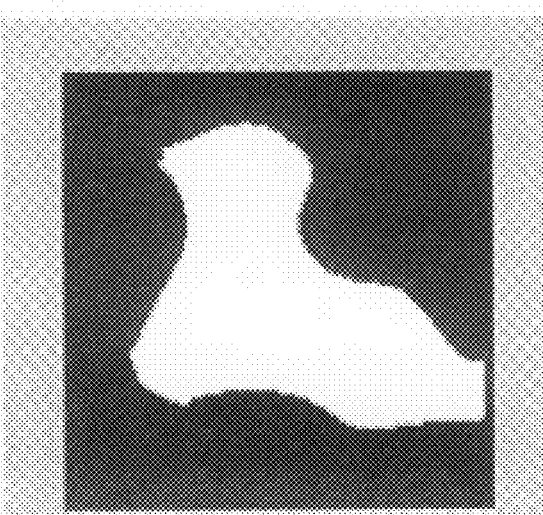
FIG. 16B shows an example of a labeled image output after processing by the image processor of the second embodiment.

Lastly, the labeled image thus formed is output (step S27) and processing by the image processor 200 ends. FIG. 16A shows an example of an image input to the image processor 200 of the second embodiment, and shows the same example of an image shown in FIG. 35A. FIG. 16B shows an example of a labeled image output after such an input image is processed by the image processor 200 of the second embodiment. In this case, labels are attached only to pixels recognized such that their extreme values indicate the brightest pixels.

Thus, the image processor according to the second embodiment very speedily recognizes each cell area of a cell image, and also very speedily divides each area of a grayscale image.

Third Embodiment

A description is given of an example of a third embodiment, which is also applied in an image processor that specifies each of the cell areas of a grayscale image, such as a cell image, to which corresponding pixels belong. The grayscale image is formed based upon luminance serving as a pixel value for each of a plurality of pixels arranged on an XY two-dimensional coordinate system that realizes a predetermined coordinate system. The third embodiment also assumes, as a cell image, a grayscale image in which luminance increases toward a center of a cell, as shown in FIG. 35A. However, the third embodiment can also be used to divide an area according to superfine luminance edges by reversing gradient directions and extreme values, as illustrated in the first embodiment.

Figure 17:
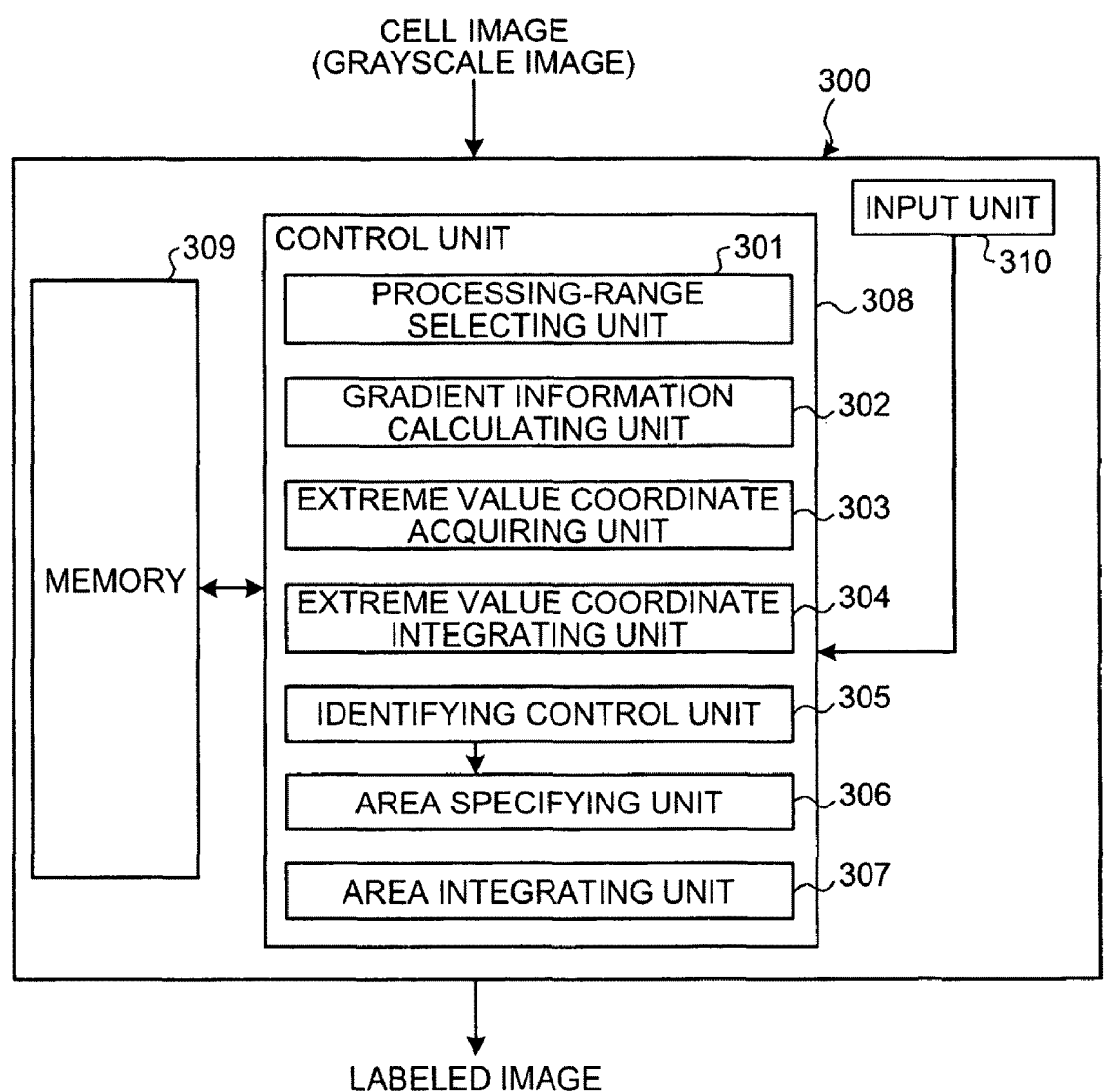
FIG. 17 is a block diagram schematically showing an example of a configuration of an image processor according to a third embodiment of the present invention.

FIG. 17 is a schematic block diagram showing an example of the configuration of an image processor 300 of the third embodiment. The image processor 300 has a control unit 308 configured as a microcomputer, which includes: a processing-range selecting unit 301, a gradient information calculating unit 302, an extreme value coordinate acquiring unit 303, an identifying control unit 305, and an area specifying unit 306, the functions of which are the same as those of the processing-range selecting unit 201, the gradient information calculating unit 202, the extreme value coordinate acquiring unit 203, the identifying control unit 205, and the area specifying unit 206 of the second embodiment; an extreme value coordinate integrating unit 304 that integrates the coordinates of extreme value pixels; and an area integrating unit 307 that integrates labeled areas based upon information about cell images located near the boundary of each label area. The image processor 300 also has a memory 309 for storing input images and data used in each unit.

Where the coordinates of extreme value pixels corresponding to pixels are located within a predetermined range, the extreme value coordinate integrating unit 304 calculates coordinates of a fresh extreme value pixel in which the coordinates of these extreme value pixels are integrated, and acquires the coordinates of the fresh extreme value pixel as coordinates corresponding to the extreme value pixels before integration. Based on the coordinates of the extreme value pixel acquired by the extreme value coordinate integrating unit 304, the area specifying unit 306 attaches a label to a target pixel. The area integrating unit 307 determines whether the luminances of pixels that belong to adjacent areas specified by different identification marks and that are located near the boundary between these areas satisfy a predetermined condition. If they satisfy the predetermined condition, the area integrating unit 307 attaches a common label to each of the adjacent areas. A configuration for inputting a cell image to be processed and a configuration for processing a labeled image after output are not limited in particular in the third embodiment.

Figure 18:
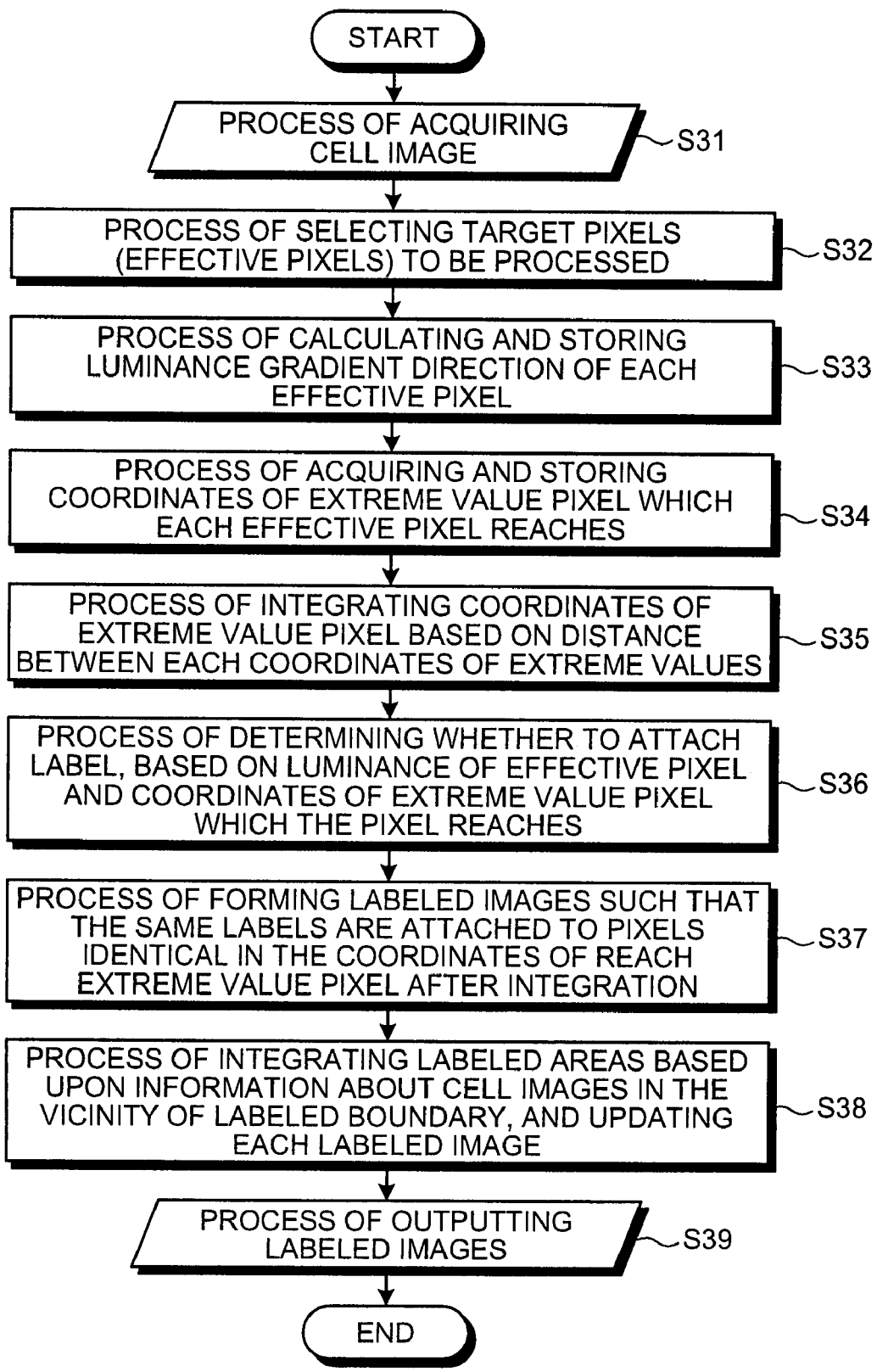
FIG. 18 is a flowchart schematically illustrating a process performed by the image processor of the third embodiment.

FIG. 18 is a flowchart schematically illustrating a process performed by the image processor 300 of the third embodiment. The processes of steps S31 to S34, S36, and S39 are the same as those of the steps S21 to S24, S25, and S27 shown in FIG. 10. Steps S35, S37, and S38 will now be explained.

Figure 19:
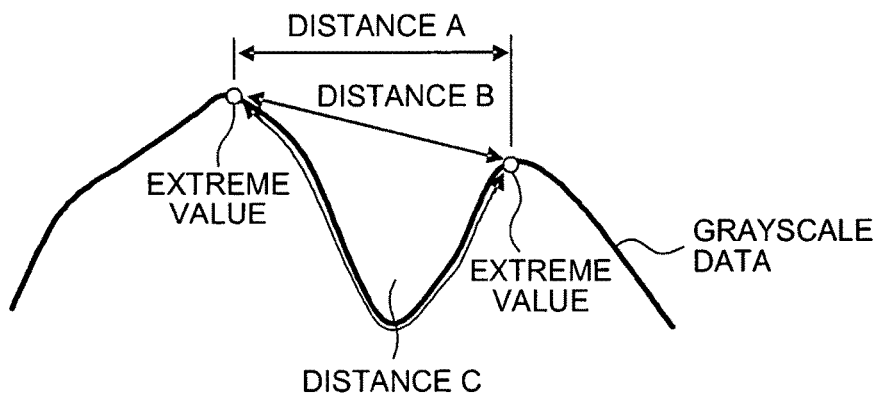
FIG. 19 is a view explaining the definition of a distance between extreme value pixels.

After the coordinate data on extreme value pixels which corresponding effective pixels reach are acquired by the extreme value coordinate acquiring unit 303, the extreme value coordinate integrating unit 304 integrates the coordinates of the extreme value pixels based on a distance between the coordinates of the extreme value pixels (step S35). This is a sort of clustering process, which can be performed by various known clustering methods. For example, one such method includes: a step of calculating a distance between coordinates of two given extreme value pixels; a step of integrating the coordinates of the two extreme value pixels when the distance is shorter than a predetermined threshold; a step of using one of the pixels (e.g., the pixel the luminance of which is greater) or a pixel at a point intermediate between the two pixels, as coordinates of a representative extreme value pixel used for the subsequent distance calculation, thereby calculating a distance between the representative extreme value pixel and the other extreme value pixel; and the step of comparing this distance with the threshold; and finally the step of integrating them again. The purpose of the process is to prevent excessive division and recognition where a plurality of extreme values exist within one area to be recognized. Regardless of the clustering method used, the definition of a distance between the extreme value pixels is an important element. Below are some distance definitions that are effective in the integration.

a. A two-dimensional distance between the two given extreme value pixels within an image (e.g., a distance A shown in FIG. 19).

b. A three-dimensional distance between the two given extreme value pixels when it is assumed that they have the highest luminances (e.g., a distance B shown in FIG. 19).

c. A route distance between the two given extreme value pixels when it is assumed that they have the highest luminances (e.g., a distance C shown in FIG. 19).

Meanwhile, if there are any other extreme value pixels which pixels reach between the two extreme value pixels, a process such as inhibiting the integration of the coordinates of these two extreme value pixels may be added. A parameter, such as a processing method and threshold, which controls the integration of the coordinates of the extreme value pixels may be set in advance as fixed or may be set based on images, etc., as a variable. Alternatively, such parameter may be externally set and processed. In this case, for example, an input unit 310 may be provided for externally receiving an extreme-value integration parameter used to specify a particular coordinate range; and based upon the extreme value coordinate integration parameter received by the input unit 310, the extreme value coordinate integrating unit 304 may calculate the coordinates of the fresh extreme value pixel.

After the coordinates of the extreme value pixels are integrated, step S36 by the identifying control unit 305 ends. Subsequently, the area specifying unit 306 forms a labeled image such that the same label is attached to the pixels with the coordinates of reach extreme value pixels after integration (step S37).

Figure 20:
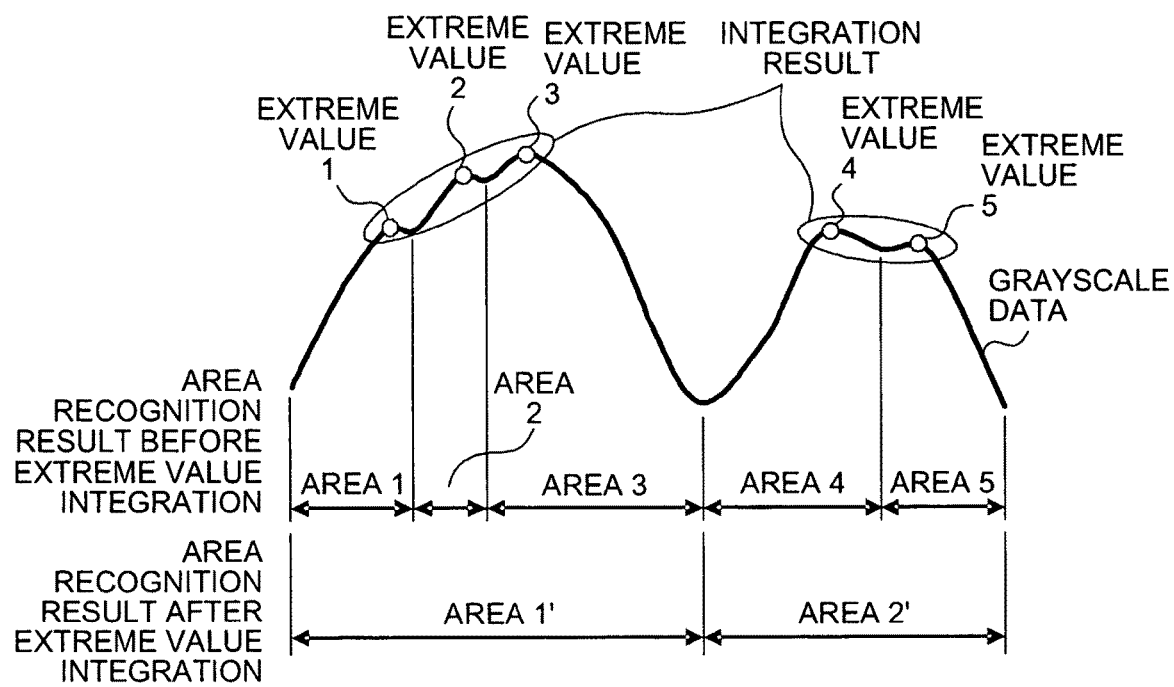
FIG. 20 shows area recognition results obtained by labeling based on a result before integration of extreme value pixels and based on a result after the integration of the extreme value pixels respectively.

FIG. 20 shows area recognition results obtained by labeling based on a result before integration of the coordinates of extreme value pixels and based on a result after the integration of the coordinates of extreme value pixels respectively. The desired recognition result of luminance data as shown in FIG. 20 is to recognize two areas, having a boundary (i.e., a trough) between the luminances of the extreme values 3 and 4. In the area recognition result based on the result before integration of the coordinates of the extreme value pixels, five areas represented by areas 1 to 5 are recognized. This is an excessive division and recognition of each cell area. On the other hand, in the area recognition result based on the result after the integration of the coordinates of the extreme value pixels, the extreme values 1, 2, and 3 close to one another in coordinates are integrated and the extreme values 4 and 5 close to each other in coordinates are also integrated. Consequently, the areas 1, 2, and 3 are integrated into a fresh area 1', and the areas 4 and 5 into a fresh area 2'. This is a desired recognition result.

Figure 21A:
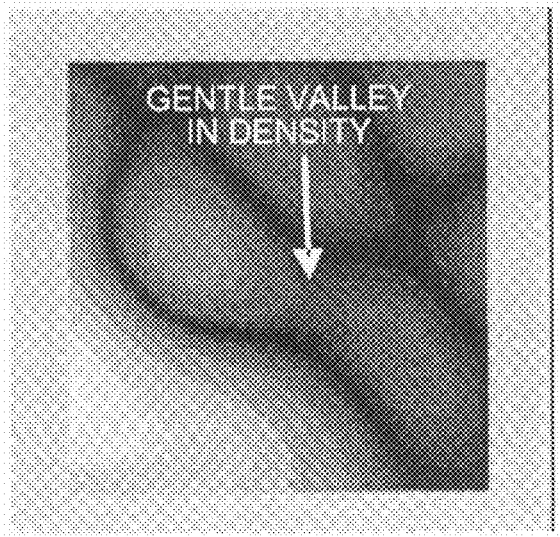
FIG. 21A shows an example of an image to be subject to an area integration process.
Figure 21B:
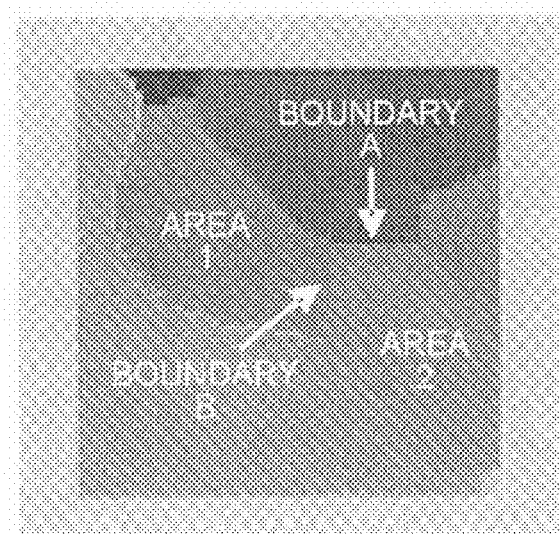
FIG. 21B shows a labeled image illustrating an example of area division before the area integration process.
Figure 21C:
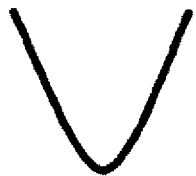
FIG. 21C is a characteristic diagram illustrating an example of a luminance change in a direction perpendicular to a boundary A shown in FIG. 22B.
Figure 21D:
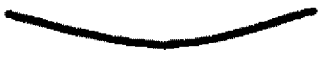
FIG. 21D is a characteristic diagram illustrating an example of a luminance change in a direction perpendicular to a boundary B shown in FIG. 22B.
Figure 22A:
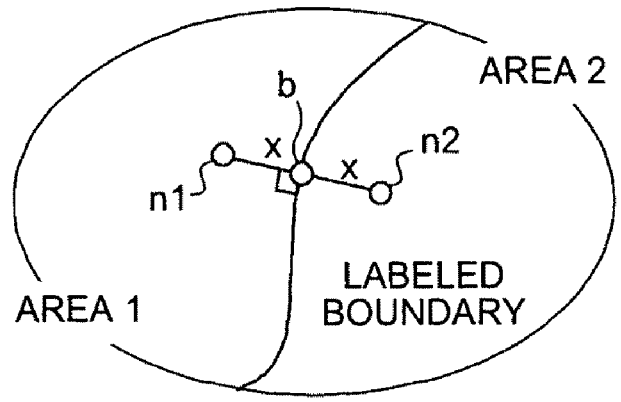
FIG. 22A is a view explaining an example of pixels used to calculate an index value when labeled areas are integrated.

After such labeled image formation, the area integrating unit 307 integrates labeled areas based upon information about cell images in the vicinity of the boundary between the labeled images, and updates each labeled image (step S38). The purpose of this step is to integrate labeled areas into which each cell area has been excessively divided by gentle valleys of luminance. For instance, if there is a gentle valley of luminance within an area to be recognized, as shown in the middle of the image in FIG. 21A, a plurality of extreme values exist within this area. However, depending on distances between the coordinates of the extreme value pixels, the above-described process by the extreme value coordinate integrating unit 304 may not be enough to satisfactorily integrate the coordinates. Accordingly, as shown in FIG. 21B, the image is divided into areas 1 and 2 and recognized. In this case, the luminance change of a cell image perpendicular to a labeled boundary A and that perpendicular to a labeled boundary B are different as shown in FIGS. 21C and 21D, one exhibiting a V-shaped and the other a gentle curve. Therefore, the area integrating unit 307 integrates the labeled areas by such a method as described below.

a. Edges of cell images separated by a given labeled boundary are extracted, the value in which the total of the outputs of the extractions is normalized by the length of the labeled boundary is compared with a threshold and, if the value is equal or lower than the threshold, the labeled areas separated by the labeled boundary are integrated. In this case, the edges may be extracted by a method adopting a general edge extraction filter that uses the primary or secondary differential of luminance.

b. Index values E1 for all areas separated by a labeled boundary are calculated. Each index value is calculated using the following formula:

$$E1 = Vn1 + Vn2 - 2 \times Vb$$

where Vb is the luminance of a pixel b on the given labeled boundary and Vn1 and Vn2 are the luminances of two pixels n1 and n2 that are perpendicular to the labeled boundary and are separated by distance x in opposite directions from the pixel b. The average of the index values E1 is compared with a threshold, and if the average is equal to or lower than the threshold, the labeled areas are integrated. FIG. 22A is a view illustrating examples of pixels b, n1, and n2 used to calculate such an index value.

Instead of the index value E1, an index value Ediff may be used. That is, the index values Ediff for all areas separated by the boundary are calculated. Each index value Ediff is calculated by the following equation:

$$Ediff=|Vn1-Vn2|$$

Subsequently, the average of the indexes is compared with a threshold and, if the average is equal to or lower than the threshold, the labeled areas separated by the labeled boundary are integrated.

Figure 22B:
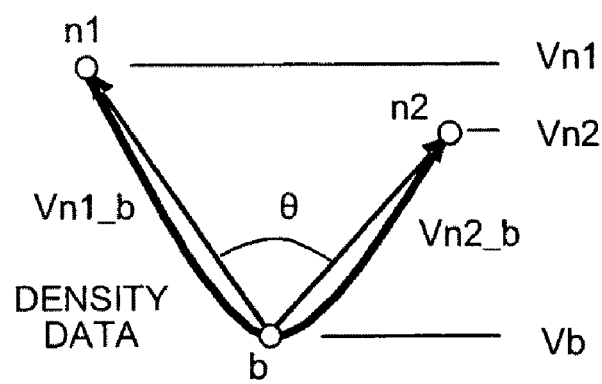
FIG. 22B is a view explaining an example of an integrated index value in labeled area integration.

(c) An angle θ formed between the vectors Vn1-b and Vn2-b, which are directions found taking account of the luminances of the above-described pixels b, n1, and n2, is calculated for each of all the areas separated by the boundary. The average of the angles θ and a threshold is compared, and if the average is equal to or greater than the threshold, labeled areas separated by the labeled boundary are integrated. FIG. 22B is a view explaining such an integrated index value.

Figure 23:
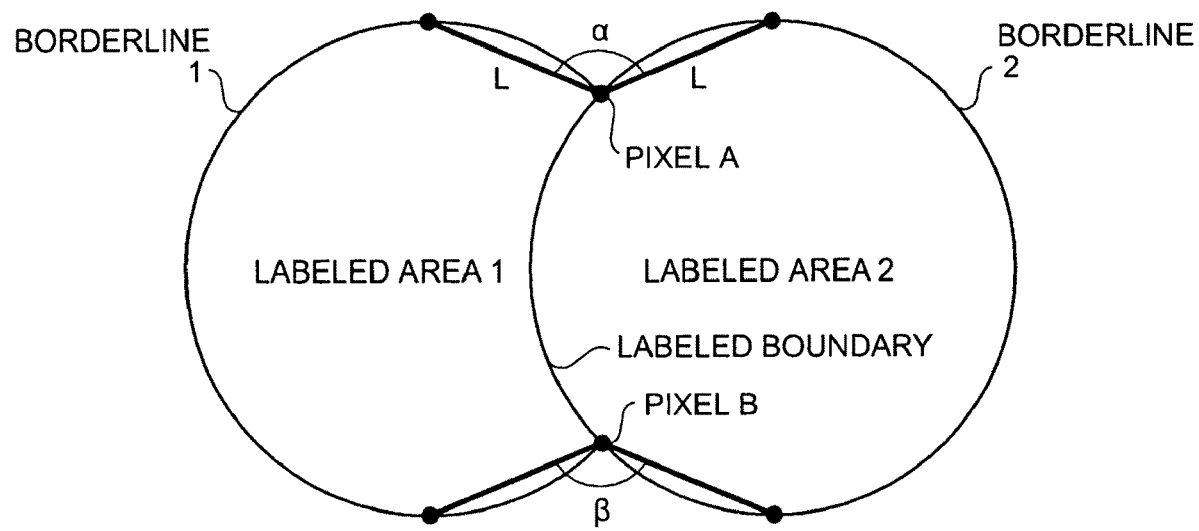
FIG. 23 is a view explaining an example of a similarity in labeled area integration.

(d) In the boundary (i.e., labeled boundary) between the adjacent labeled areas, the interunit angles α and β of the borderlines of the labeled areas 1 and 2, α at one end of the labeled boundary and β at the other end, are calculated. The average of the interunit angles is considered as similarity. If the similarity is equal to or greater than a threshold, the adjacent labeled areas are integrated. FIG. 23 is a view explaining an example of the similarity when such labeled areas are integrated.

In this case, there are various methods for calculating the interunit angles α and β of the borderlines. For example, the borderline interunit angle α (or boarder line interunit angle β) may be calculated by measuring an angle formed by connecting line segments one of which is obtained by connecting a pixel A (or pixel B) which is one end of the labeled boundary and a pixel on the borderline 1, separated a predetermined distance L (e.g., a distance corresponding to several pixels) from the pixel A (or pixel B), the other of which is obtained by connecting the pixel A (or pixel B) and a pixel on the borderline 2, separated a predetermined distance L from the pixel A (or pixel B).

Further, the predetermined distance L may be variously changed to calculate a plurality of borderline interunit angles αi (or borderline interunit angles βi), and the average of the borderline interunit angles αi (or borderline interunit angles βi) can be calculated as the borderline interunit angle α (or borderline interunit angle β).

Instead of the average, the minimum value, maximum value, or intermediate value may be calculated and used as the borderline interunit α (or borderline interunit angle β).

If it is assumed that the borderline of an object to be processed has the shape of an approximately outward projection and the borderline interunit α (or borderline interunit angle α) is smaller than 180°, this borderline is not considered as the borderline of a single object but the borderlines of two objects present in contact with each other and that the labeled boundary coincides with the boundary between the two objects. On the other hand, if the boarder line interunit angle α (or borderline interunit angle β) is greater than 180°, two labeled areas are considered to have been erroneously assigned to a single object. If the former (where similarity is small), the two labeled areas may be left as they are, and if the latter (where similarity is large), the two labeled areas may be integrated.

In practice, the average of the boarder line interunit angles α and β is compared with a threshold and if the average is equal to or greater than the threshold, the labeled areas are integrated. Instead of the average of α and β, the minimum value or maximum value may be compared with the threshold.

Meanwhile, a parameter, such as a processing method and a threshold, which controls the integration of the labeled areas may be set in advance as fixed or may be set based on images, etc., as a variable. Alternatively, such parameter may be externally set and processed. In this case, for example, the input unit 310 may be provided for externally receiving the inputs of an area integration parameter used to specify whether a predetermined condition is satisfied; and based upon the area integration parameter received by the input unit 310, the area integration unit 307 may determine whether the predetermined condition is satisfied.

Figure 24A:
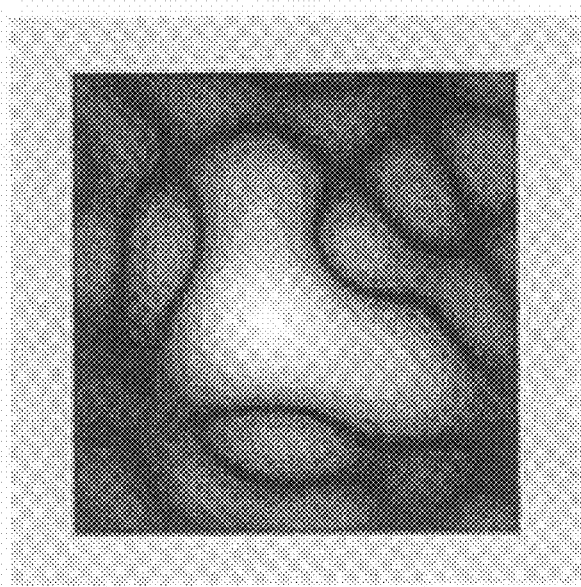
FIG. 24A shows an example of an image input to the image processor of the third embodiment.
Figure 24B:
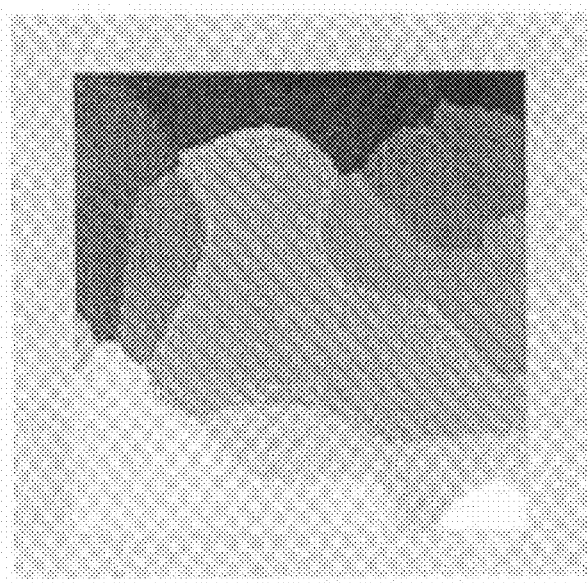
FIG. 24B shows an example of labeled images output after processing by the image processor of the third embodiment.

The same label is attached to each of the labeled areas integrated by the foregoing processing, and thus the labeled image is updated. In this case, exactly the same label is not necessarily attached to each of them but a label indicating the identity may be attached. Lastly, the updated labeled images are output (step S39) and processing by the image processor 300 ends. FIG. 24A shows an example of an image input to the image processor 300 of the third embodiment, and FIG. 24B shows an example of labeled images output after such input image is processed by the image processor 300 of the third embodiment. FIGS. 24A and 24B show that the labeled areas separated by the gentle valleys of luminance are integrated.

Each of the label area integrating methods may be used alone but a combination ensures more accurate integration of the labeled areas. For instance, in the methods a to d, if numeric values to be compared with a threshold are assigned as corresponding index values, the weighted total, minimum value, maximum value, average or intermediate value of the index values may be calculated as a total index value, and the total index value and a threshold may be compared to determine whether the labeled areas are integrated.

Thus, the image processor 300 according to the third embodiment prevents excessive division and recognition of the cell image, and recognizes each cell area. The processor 300 also prevents excessive division of the grayscale image, and divides each area.

Fourth Embodiment

A description is given of an example of a fourth embodiment, which is also applied in an image processor that specifies each cell area of a grayscale image, such as a cell image, to which corresponding pixels belong. The grayscale image is formed based upon luminance serving as a pixel value for each of a plurality of pixels arranged on an XY two-dimensional coordinate system that realizes a predetermined coordinate system. The fourth embodiment also assumes, as a cell image, a grayscale image in which luminance increases toward the center of a cell, as shown in FIG. 35A. However, the fourth embodiment can also be used to divide an area according to superfine luminance edges by reversing gradient directions and extreme values, as illustrated in the first embodiment.

Figure 25:
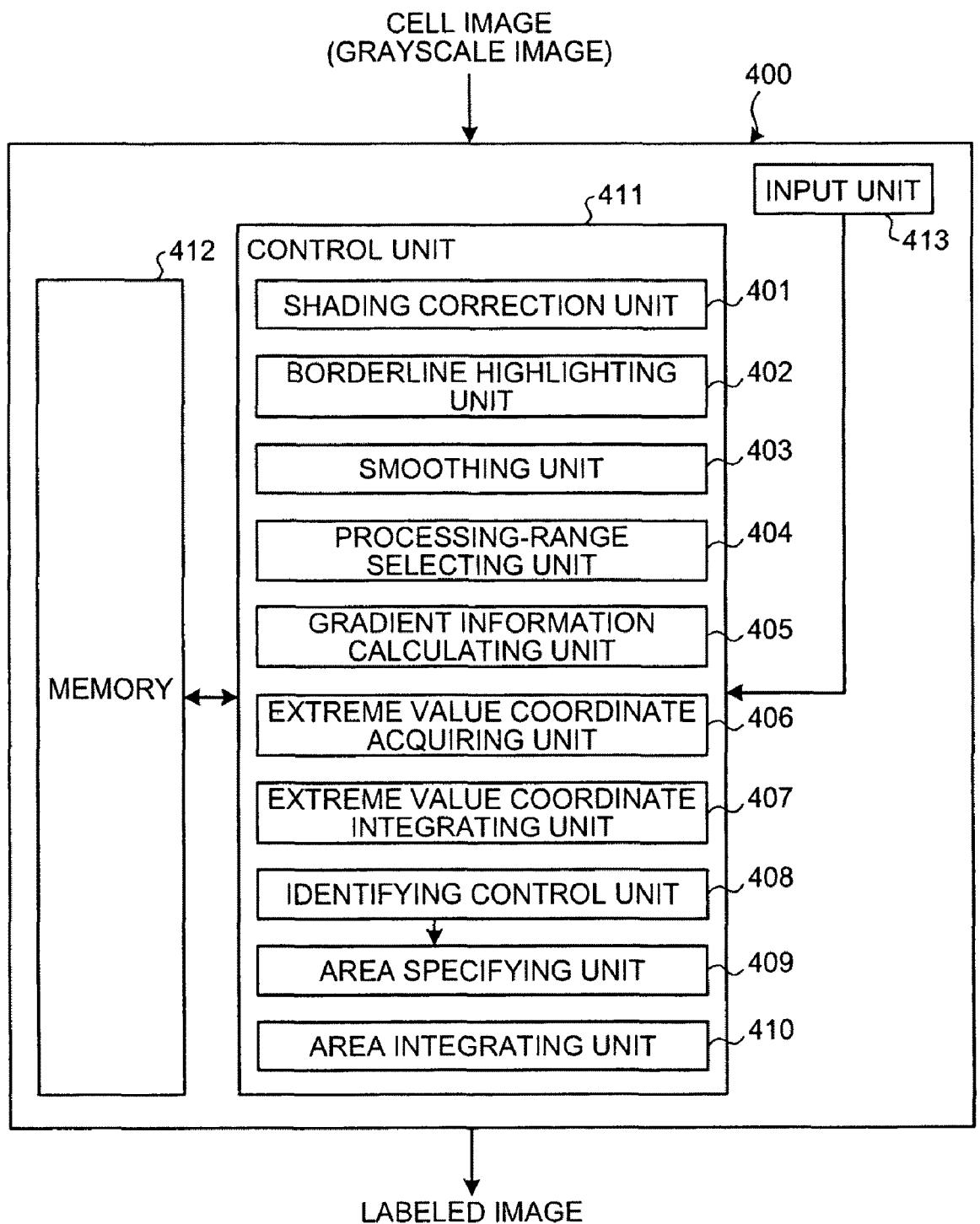
FIG. 25 is a block diagram schematically showing an example of a configuration of an image processor according to a fourth embodiment of the present invention.

FIG. 25 is a block diagram schematically showing an example of a configuration of an image processor of the fourth embodiment. An image processor 400 according to the fourth embodiment has a control unit 411 configured as a microcomputer. In addition to units 404 to 410 corresponding to the units 301 to 307 described in the third embodiment, the control unit 411 includes: a shading correction unit 401 for correcting a shading of a grayscale image, a borderline highlighting unit 402 for highlighting a borderline on a grayscale image, and a smoothing unit 403 for smoothing a density of the grayscale image. Reference number 412 represents a memory for storing an input image and data used in each unit.

Figure 26:
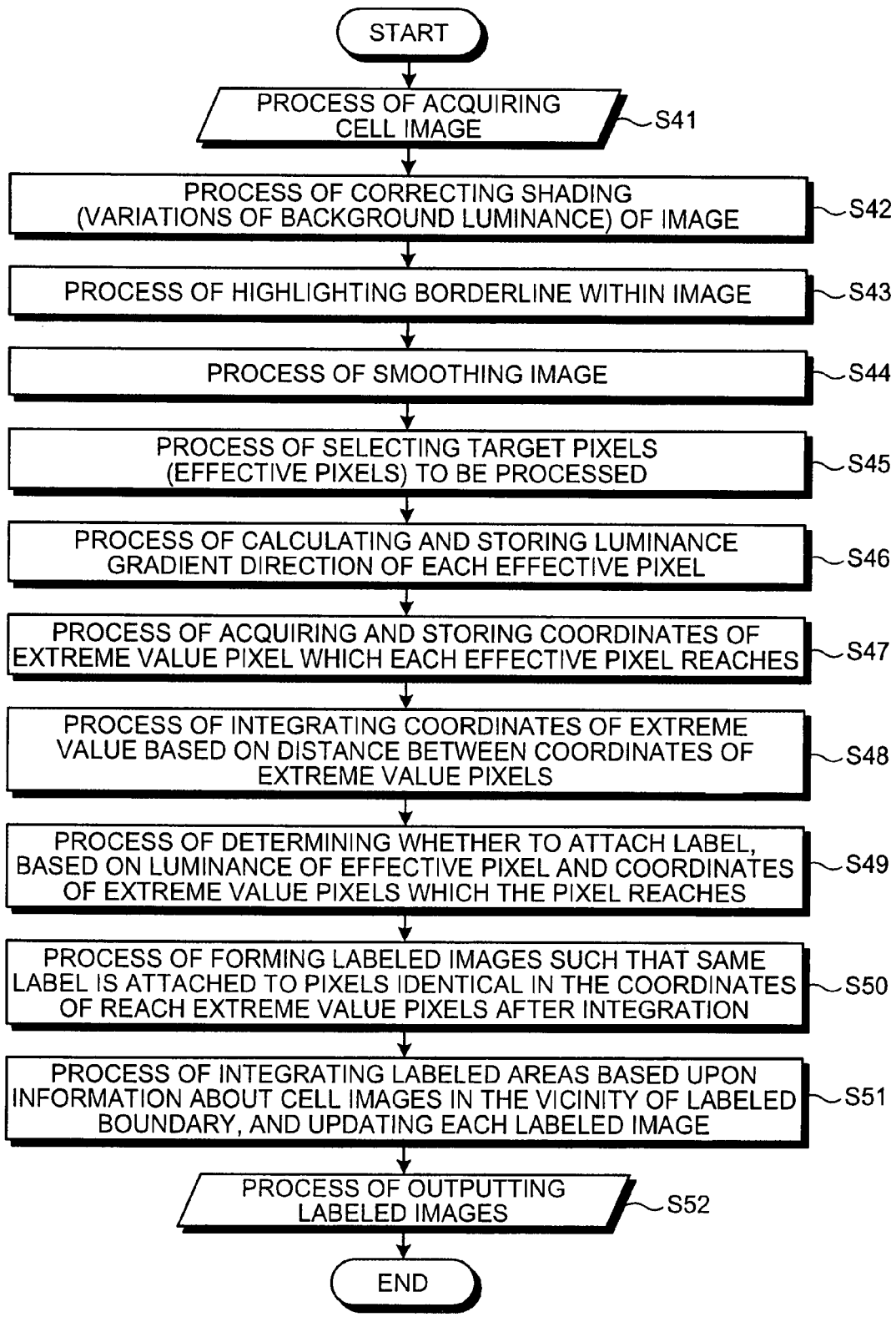
FIG. 26 is a flowchart schematically illustrating a process performed by the image processor of the fourth embodiment.

FIG. 26 is a flowchart schematically illustrating a process performed by the image processor 400 of the fourth embodiment. The processes of step S41 and S45 to S52 are identical to those of steps S31 and S32 to S39 described in the third embodiment, and only steps S42 to S44 will be described below.

Initially, the shading correction unit 401 corrects the shading of an input cell image (step S42). There are various shading correction methods for correcting the variations of background luminance. Here, a description is given of an example of a shading correction made using a top-hat process, which is a morphology process (refer to MORPHOLOGY by Hidefumi Obata, Corona Publishing Co., Ltd.). First, a cell image is subject to a density opening process. The density opening process corresponds to a process in which, in a three-dimensional space assumed to be of high luminance, a reference figure (called a structural element) is moved while circumscribed around a target image from low luminance, and thereby a locus along which the maximum value of the outer circumference of the structural element passes is obtained (refer to FIG. 27(*a*), (*b*)). By setting an appropriate structural element, only the low frequency variations of background luminance can be extracted (refer to FIG. 27(*c*)). Subsequently, the image subjected to the density opening process is removed from the original cell image. Consequently, variations in background luminance are corrected, and an image is obtained in which only luminance changes indicating a cell area remain (refer to FIG. 27(*d*)).

Meanwhile, a parameter which controls the shading correction, such as a structural element, may be set in advance as fixed or may be set based on images as variable. Alternatively, the parameter may be externally set and processed. In this case, for example, an input unit 413 may be provided for externally receiving the shading correction parameter used to correct the shading of the grayscale image; and based upon the shading correction parameter received by the input unit 413, the shading correction unit 401 may correct the shading of the grayscale image.

Subsequently, the borderline highlighting unit 402 highlights a borderline within the image subjected to the shading correction (step S43). In an area where cells overlap, luminance valleys may not be formed in a boundary, as shown in FIG. 28(*a*). In order to form clear luminance valleys in such boundary, processing as described below is performed. First, an edge of the image subjected to shading correction is extracted, as shown in FIG. 28(*b*). The edge may be extracted by a method adopting a general edge extraction filter that uses a primary or secondary differential of luminance. Next, the image of which the edge thereof has been extracted is multiplied by coefficient α, and the result of this is removed from the image subjected to the shading correction, as shown in FIG. 28(*c*). Accordingly, luminance valleys indicating a cell boundary are formed in the borderline that has abrupt luminance changes.

A parameter, such as an edge extraction method and a coefficient, which controls a borderline highlighting process may be set in advance as, fixed or may be set based on images, etc., as variable. Alternatively, the parameter may be externally set and processed. In this case, an input unit 413 is additionally provided for externally receiving an edge highlighting parameter used to highlight the borderline of area in the grayscale image; and based on the edge highlighting parameter received by the input unit 413, the borderline highlighting unit 402 may highlight the borderline of the area in the grayscale image.

Next, the smoothing unit 403 smoothes the image subjected to the borderline highlighting (step S44). The purpose of smoothing is, as shown in FIG. 28(*d*), to remove original noise of the input cell image or noise generated by processes through which the input cell image has passed. The smoothing process can be performed by various known smoothing filters.

A parameter that controls smoothing may be set in advance as fixed or may be set on images, etc., as a variable. Alternatively, the parameter may be externally set and processed. In this case, an input unit 413 may be provided for externally receiving the smoothing parameter used for the smoothing process; and according to the smoothing parameter received by the input unit 413, the smoothing unit 403 may perform the smoothing process.

Processing steps S45 to 53 as in the third embodiment are performed for the images which have passed through above-described steps S42 to S44, and thereby labeled images are formed and output.

The image processor 400 according to the fourth embodiment recognizes a cell area even if the cell image shows variation in background luminance or overlapping cells. Additionally, the image processor 400 is capable of dividing each area even in a grayscale image with variation in background luminance.

Fifth Embodiment

Figure 29:
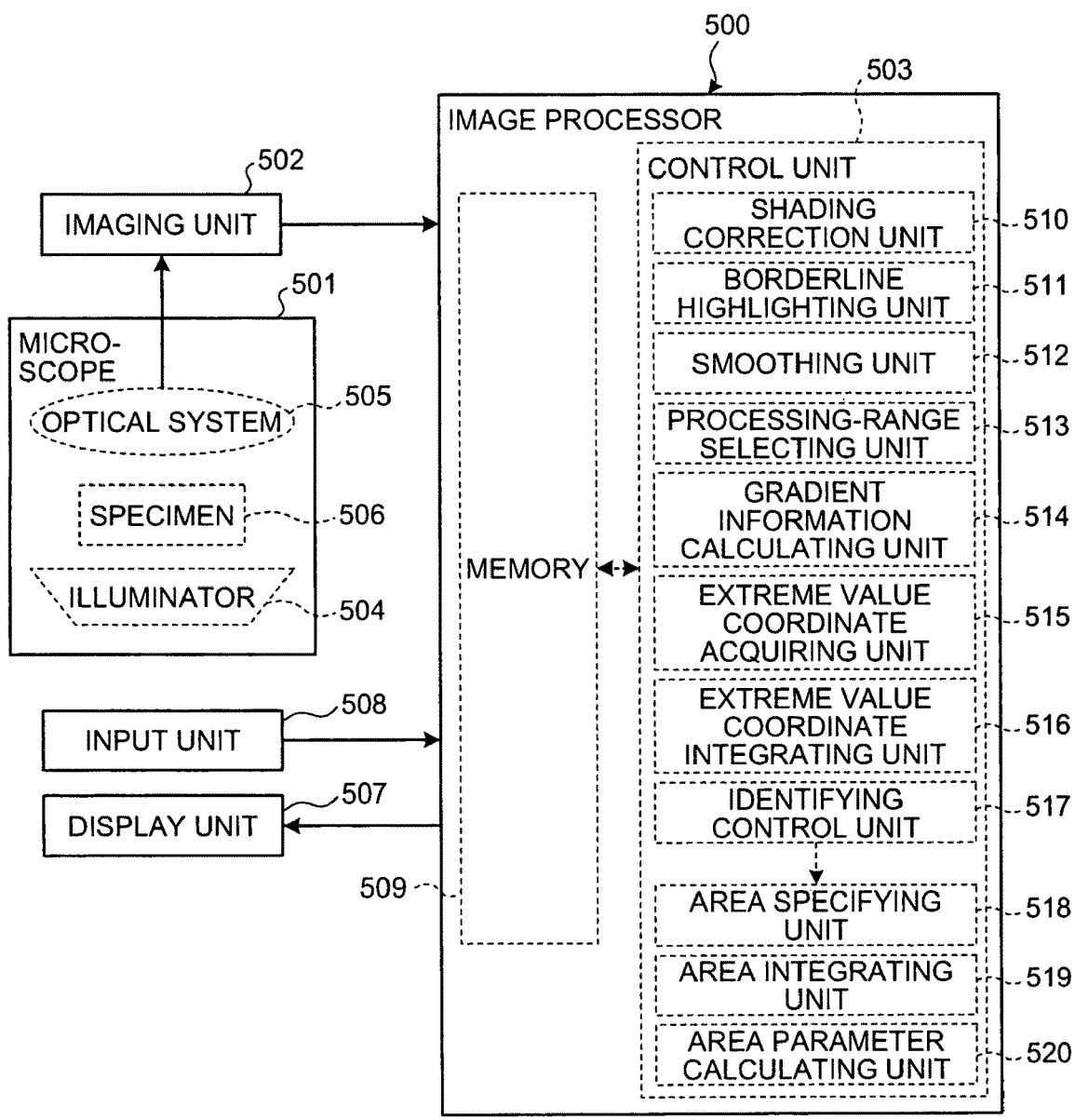
FIG. 29 is a schematic diagram showing a configuration of an image processor according to a fifth embodiment of the present invention.

FIG. 29 is a schematic diagram showing a configuration of a fifth embodiment of the present invention. For example, the fifth embodiment is applied in a microscope system incorporating an image processor 500 that includes, in addition to the configuration of the fourth embodiment, an imaging unit 502 for acquiring the image data of a grayscale image. To be specific, the microscope system includes; a microscope 501 for obtaining a desired enlarged optical image of a specimen 506 by means of an illuminator 504 and an imaging optical system 505; the imaging unit 502 for obtaining an electronic image by photo-electrically converting the optical image obtained by the microscope 501; a control unit 503 for recognizing a recognition target within the specimen 506 by processing the electronic image; a display unit 507 for displaying a parameter used for a labeling process and images involved in the labeling process; an input unit 508 for receiving the inputs of various parameter, etc., and other input; and a memory 509 for storing input image or data used in each unit.

In this case, the microscope 501 and imaging unit 502 can be realized by known technologies. The electronic image corresponds to the grayscale image described in the fourth embodiment. The control unit 503 is identical in function to the control unit 411 explained in the fourth embodiment, and includes units 510 to 519 corresponding to the units 401 to 410 described in the fourth embodiment. The control unit 503 additionally includes an area parameter calculating unit 520 that obtains an area parameter determining the a property of each area specified by a label attached by the area specifying unit 518. The display unit 507 displays, as necessity requires, a parameter used for the labeling process by the image processor 500 and images involved in the labeling process. In the fifth embodiment, the display unit 507 functions as an area parameter display unit that displays a area parameter calculated by the area parameter calculating unit 520. The input unit 508 receives various input operations performed by an operator.

Figure 30:
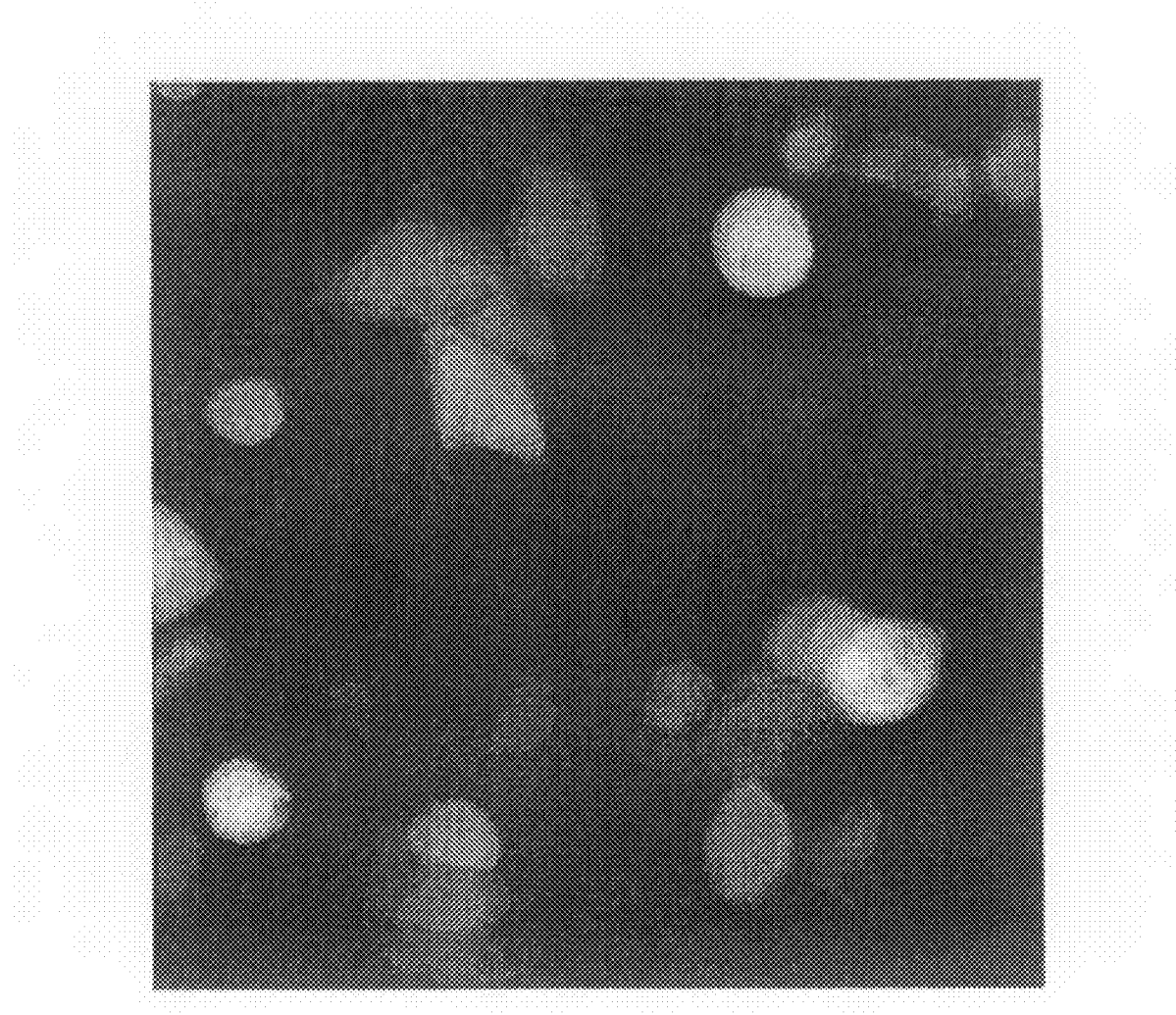
FIG. 30 is an example of a cell image obtained by a microscope.
Figure 31:
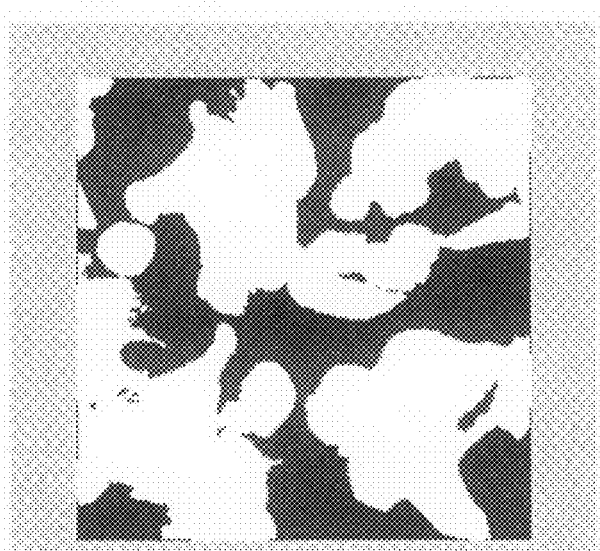
FIG. 31 shows an example of an image obtained as a result of dividing the image shown in FIG. 30 into a cell area and a background area.
Figure 32:
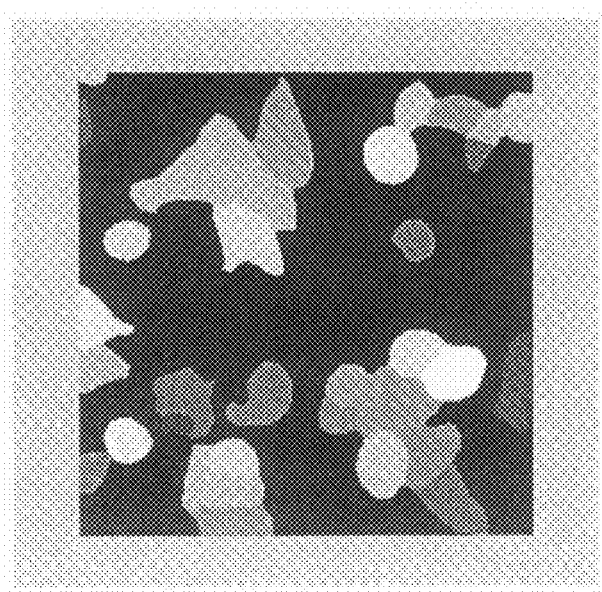
FIG. 32 shows an example of an image obtained as a result of recognizing cell areas based on the image shown in FIG. 30.
Figure 33A:
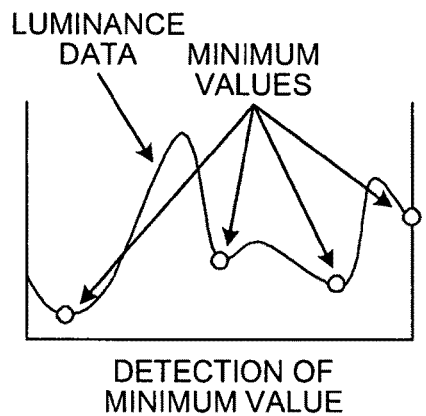
FIG. 33A is a diagram explaining an example of minimum values in the Watershed algorithm.
Figure 33B:
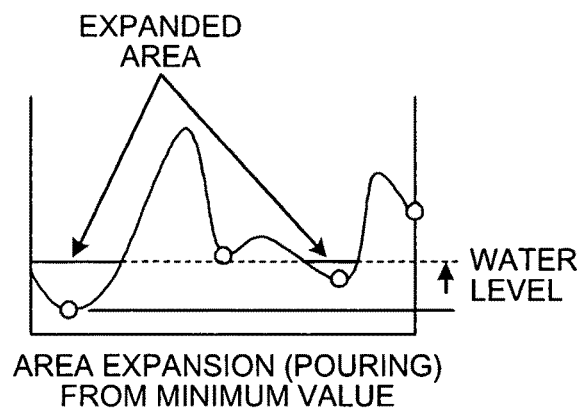
FIG. 33B is a diagram explaining expansion from the minimum values in the Watershed algorithm.
Figure 33C:
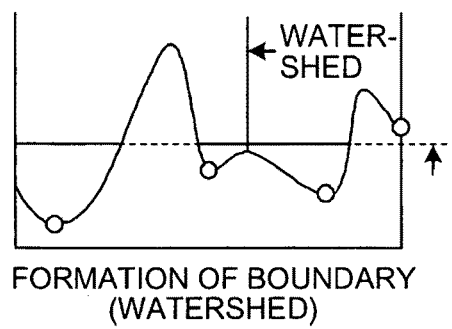
FIG. 33C is a diagram explaining an example of a formation of a boundary in the Watershed algorithm.
Figure 33D:
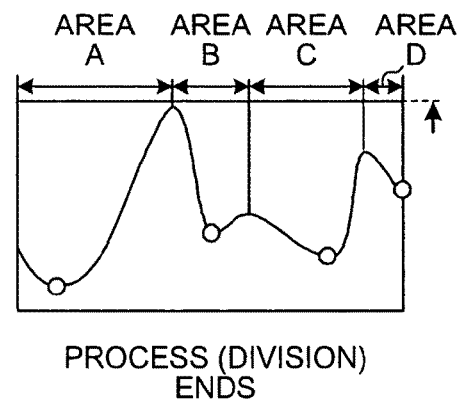
FIG. 33D is a diagram explaining an example of a result of a division process using the Watershed algorithm.

FIGS. 30 to 32 show examples of images displayed by the display unit 507 during the process. FIG. 30 is an example of a cell image obtained by the microscope 501 and imaging unit 502, and the cell image is input to the image processor 500. FIG. 31 is an image in which cell areas selected by the processing-range selecting unit 513 of the image processor 500 during processing of the image shown in FIG. 30 are shown as bright parts. That is, the display unit 507 displays at least images distinguished by the range of pixels selected by the processing-range selecting unit 513. FIG. 32 shows an image obtained as the result of processing the image shown in FIG. 30 and finally labeling the area of each of the cells. That is, the display unit 507 at least displays images distinguished by the area specified with labels attached by the area specifying unit 518.

After the labeled images are formed, the area parameter calculating unit 520 calculates the area parameter determining the property of each area specified by the label attached by the area specifying unit 518. The display unit 507 displays the area parameter calculated.

In this case, the area parameter determining the property of the areas comprise a numeric value representing the size of an area being processed, a numeric value representing its shape, a numeric value representing its position, a numeric value representing its luminance or color, a numeric value representing a ratio between the areas, a numeric value representing the number of areas, a numeric value representing the assemblage of areas, etc. The numeric value representing the size of an area being processed includes the area, the length, the width, the maximum, minimum, or average diameter, the maximum, minimum, or average radius, the circumference, the enveloping circumference, the circumference of an ellipse, the long or short axial length, the maximum, minimum, or average Feret diameter, the circumscribed quadrangular area ratio, the circumference of a projection, etc. The numeric value representing the shape of an area includes the slenderness ratio, the radius ratio, circularity, the Euler number, flakiness, fractal dimension, the number of branches, the number of end points, the number of roughness, etc. The numeric value representing the position of an area includes the gravity of the position, the gravity of density, the position of the circumscribed quadrangle, inclination, etc. The numeric value of the luminance or color of an area includes the maximum, minimum, or average density, the total density, dispersion, standard deviation; integral optical density, the degree of agglomeration, nonhomogeneity, marginal degree, etc. The numeric value representing the number of areas includes the number of areas, the number of holes, etc. The numeric value representing the assemblage of areas includes the area class, the maximum, minimum, or average distance between areas, the relative distance, dispersion, traveling, etc. The assembly or spread of individual cells, their degree of contact, a cell colony, and so on can be recognized, referring to these parameters. Such parameters are not limited to two-dimensional numeric values but may be numeric values calculated from areas other than the forgoing areas, one-dimensional numeric values such as a line profile, or three-dimensional numeric values such as a density distribution.

The parameters calculated by the area parameter calculating unit 520 are transferred to the area-parameter display unit 412, which displays the results of the extraction of areas based on the calculated parameters of the areas. The area-parameter display unit 412 shows each of the extracted areas as image data, by displaying it in different brightnesses or colors, by displaying it with the borderline of the area, or by displaying it with a mark put at the median point. However, the methods are not limited thereto but any method may be used as long as each area can be identified. In addition, the numeric value data of each area, such as the position of the area and the amount of space covered by the area, may be displayed as parameters. Further, the area parameter display unit 412 may display the image data and/or the numeric value data or may switch between them. Alternatively, in accordance with the contents of parameters, a display system may be changed.

According to the fifth embodiment described above, each cell area can be precisely recognized from an image obtained by imaging a microscope specimen under desired conditions. Additionally, the fifth embodiment makes it possible to speedily check the result of recognition by displaying images and parameters during the process.

While the descriptions of several examples of the image processor of the present invention have been given, it will be obvious that the image processor of the present invention may be used in combination with any other known cell-recognizing apparatus or apparatuses. In addition, a cell image or tissue image to be processed may be a fluoroscopic image or may be formed using a fluoroscopic image, phase difference image, differential interference image, or the like. Further, the image processor of the present invention may be used for the recognition of the microtubule of the depth image of an AFM (Atomic Force Microscope) or the recognition of a labeled microtubule distribution area. Furthermore, as for a multi-labeled target, grayscale images of different wavelengths may be acquired and processed.

Further, the processing of each unit such as the gradient information calculation unit 101 described above may be performed by a computer, such as a personal computer, following an area specifying program assigned in advance. This area specifying program can be distributed via a network such as the Internet. The area specifying program may be recorded on a recording medium, such as a hard disk, FD, CD-ROM, MO or DVD, which is readable by a computer and may be executed by its being read from the recording medium by the computer.

INDUSTRIAL APPLICABILITY

As has thus been described, the image processor, microscope system and area specifying program according to the invention are useful for dividing a grayscale image into areas and are, in particular, suitable for recognizing the areas of each cell based upon an image obtained by imaging the cell.

The invention claimed is:

1. An image processor performing a process of specifying an area to which a plurality of pixels of a grayscale image belongs, the grayscale image being formed based on a pixel value of each of the plurality of pixels arranged on a predetermined coordinate system, the image processor comprising:
   a gradient information calculating unit that calculates gradient information corresponding to a change in the pixel value between the plurality of pixels;
   an extreme value coordinate acquiring unit that sets a pixel selected from the plurality of pixels as a target pixel, performs a scanning on at least one of the plurality of pixels including the target pixel from the target pixel in accordance with the gradient information, and acquires a coordinate of the scanned pixel corresponding to an extreme value of the pixel value as a coordinate of an extreme value pixel corresponding to the target pixel; and an area specifying unit that labels the target pixel with an area identification mark used for specifying the area to which the plurality of pixels belongs, wherein the extreme value coordinate acquiring unit successively sets the each of the plurality of pixels as the target pixel and acquires the coordinate of the extreme value pixel corresponding to the each of the plurality of pixels, and wherein if coordinates of extreme value pixels corresponding to different pixels in the plurality of pixels are located close to each other within a particular range, the area specifying unit labels each of the different pixels with an area identification mark indicating the identity of the area to which the plurality of pixels belongs.

2. An image processor according to claim 1, wherein the gradient information calculating unit calculates the gradient information by multiplying a difference between pixel values of adjacent pixels by a coefficient corresponding to a distance between the adjacent pixels.

3. An image processor according to claim 1, further comprising a processing-range selecting unit that selects a pixel to be processed by the gradient information calculating unit, the extreme value coordinate acquiring unit, and the area specifying unit.

4. An image processor according to claim 3, further comprising an input unit that externally receives a processing range specifying parameter used to specify a range that includes the pixel to be processed by the gradient information calculating unit, the extreme value coordinate acquiring unit, and the area specifying unit, wherein, based on the processing range specifying parameter received by the input unit, the processing-range selecting unit selects the range that includes the pixel to be processed by the gradient information calculating unit, the extreme value coordinate acquiring unit, and the area specifying unit.

5. An image processor according to claim 1, wherein the extreme value coordinate acquiring unit acquires the coordinate of the extreme value pixel corresponding to the target pixel with reference to a coordinate of an extreme value pixel corresponding to a pixel adjacent to the target pixel in a direction specified by the gradient information.

6. An image processor according to claim 1, further comprising an identifying control unit that controls attaching the area identification mark by the area specifying unit, based on at least one of the pixel value of the target pixel or the pixel value of the extreme value pixel corresponding to the target pixel.

7. An image processor according to claim 6, further comprising an input unit that externally receives an identifying parameter used to control attaching the area identification mark by the area specifying unit, wherein, based on the identifying parameter received by the input unit, the identifying control unit controls attaching the area identification mark by the area specifying unit.

8. An image processor according to claim 1, further comprising an extreme value coordinate integrating unit that, when a distance between the coordinates of the extreme value pixels each of which is corresponding to each of the plurality of pixels is within a predetermined range, calculates a coordinate of a fresh extreme value pixel in which the coordinates of the plurality of extreme value pixels are integrated, thereby acquires the coordinate of the fresh extreme value pixel as the coordinate of the extreme value pixel assigned before the integration, wherein, based on the coordinate of the fresh extreme value pixel acquired by the extreme value coordinate integrating unit, the area specifying unit attaches the area identification mark to the target pixel.

9. An image processor according to claim 2, further comprising an input unit that externally receives an extreme value coordinate integration parameter used to specify the predetermined coordinate range, wherein, based on the extreme value coordinate integration parameter received by the input unit, the extreme value coordinate integrating unit calculates the coordinate of the fresh extreme value pixel.

10. An image processor according claim 1, further comprising an area integrating unit that determines whether a pixel value of a pixel that belongs to adjacent areas specified by different identification marks and that is located near a boundary between the adjacent areas satisfies a predetermined condition, and attaches the area identification mark indicating the identity to each of the adjacent areas if they satisfy the predetermined condition.

11. An image processor according to claim 10, further comprising an input unit that externally receives an area integration parameter used to determine whether the predetermined condition is satisfied, wherein, based on the area integration parameter received by the input unit, the area integration unit determines whether the predetermined condition is satisfied.

12. An image processor according to claim 1, further comprising a borderline highlighting unit that highlights a borderline of the area of the grayscale image.

13. An image processor according to claim 12, further comprising an input unit that externally receives an edge highlighting parameter used to highlight the borderline of the area of the grayscale image, wherein, based on the edge highlighting parameter received by the input unit, the borderline highlighting unit highlights the borderline of the area of the grayscale image.

14. An image processor according to claim 1, further comprising a shading correction unit that corrects a shading of the grayscale image.

15. An image processor according to claim 14, further comprising an input unit that externally receives a shading correction parameter used to correct the shading of the grayscale image, wherein, based on the shading correction parameter received by the input unit, the shading correction unit corrects the shading of the grayscale image.

16. An image processor according to claim 1, further comprising a smoothing unit that perform a smoothing process to smooth a density of the grayscale image.

17. An image processor according to claim 16, further comprising an input unit that externally receives a smoothing parameter used for the smoothing process, wherein, in accordance with the smoothing parameter received by the input unit, the smoothing unit performs the smoothing process.

18. An image processor according to claim 1, wherein the grayscale image is an image obtained by imaging a cell or tissue.

19. An image processor according to claim 1, further comprising a display unit that displays at least a parameter used for the process of specifying the area or an image involved in the process of specifying the area.

20. An image processor according to claim 1, further comprising a display unit that displays a procedure of the process of specifying the area, wherein the display unit displays at least an image distinguishing the area specified by the area identification mark.

21. An image processor according to claim 3, further comprising a display unit that displays a procedure of the process of specifying the area, wherein the display unit displays at least an image distinguishing the range that includes the pixel selected by the processing-range selecting unit.

22. An image processor according to claim 1, further comprising:
    an area parameter calculating unit that calculates an area parameter determining a property of the area specified by the area identification mark; and
    an area parameter display unit that displays the area parameter.

23. An image processor according to claim 1, further comprising an imaging unit that acquires image data of the grayscale image.

24. A microscope system having the image processor according to claim 23, comprising an imaging optical system used to enlarge and project a target, wherein the imaging unit of the image processor acquires the image data by imaging the target enlarged and projected on the imaging face of the imaging optical system.

25. A computer readable recording device storing programmed instructions for specifying an area to which a plurality of pixels of a grayscale image belongs, the grayscale image being formed based on a pixel value of each of the plurality of pixels arranged on a predetermined coordinate system, wherein the instructions, when executed by a computer, cause the computer to perform:
    calculating gradient information corresponding to a change in the pixel value between the plurality of pixels;
    setting a pixel selected from the plurality of pixels as a target pixel;
    performing a scanning on at least one of the plurality of pixels including the target pixel from the target pixel in accordance with the gradient information;
    acquiring a coordinate of the scanned pixel corresponding to an extreme value of the pixel value as a coordinate of an extreme value pixel corresponding to the target pixel; and
    labeling the target pixel with an area identification mark used for specifying the area to which the plurality of pixels belongs,
    wherein the setting successively setting the each of the plurality of pixels as the target pixel,
    wherein the acquiring acquires the coordinate of the extreme value pixel corresponding to the each of the plurality of pixels, and
    wherein if coordinates of extreme value pixels corresponding to different pixels in the plurality of pixels are located close to each other within a particular range, the labeling labels each of the different pixels with an area identification mark indicating the identity of the area to which the plurality of pixels belongs.

* * * * *